(12) United States Patent
Hendry et al.

(10) Patent No.: US 12,273,506 B2
(45) Date of Patent: Apr. 8, 2025

(54) MULTILAYER-BASED IMAGE CODING METHOD IN VIDEO OR IMAGE CODING SYSTEM

(71) Applicant: LG Electronics Inc., Seoul (KR)

(72) Inventors: Hendry Hendry, Seoul (KR); Junghak Nam, Seoul (KR); Hyeongmoon Jang, Seoul (KR); Jaehyun Lim, Seoul (KR); Seunghwan Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 94 days.

(21) Appl. No.: 17/927,108

(22) PCT Filed: May 11, 2021

(86) PCT No.: PCT/KR2021/005872
§ 371 (c)(1),
(2) Date: Nov. 22, 2022

(87) PCT Pub. No.: WO2021/235759
PCT Pub. Date: Nov. 25, 2021

(65) Prior Publication Data
US 2023/0209041 A1   Jun. 29, 2023

Related U.S. Application Data

(60) Provisional application No. 63/028,600, filed on May 22, 2020.

(51) Int. Cl.
*H04N 19/105* (2014.01)
*H04N 19/132* (2014.01)
(Continued)

(52) U.S. Cl.
CPC ......... *H04N 19/105* (2014.11); *H04N 19/132* (2014.11); *H04N 19/174* (2014.11); *H04N 19/176* (2014.11)

(58) Field of Classification Search
None
See application file for complete search history.

(56) References Cited

U.S. PATENT DOCUMENTS

2014/0294062 A1* 10/2014 Chen ............... H04N 19/503
375/240.02
2014/0294063 A1* 10/2014 Chen ............... H04N 19/33
375/240.02
(Continued)

FOREIGN PATENT DOCUMENTS

| KR | 20140088014 | 7/2014 |
| KR | 102025413 | 9/2019 |
| KR | 20200035484 | 4/2020 |

OTHER PUBLICATIONS

Bross et al., "Versatile Video Coding (Draft 9)," JVET-R2001-vA, Presented at Joint Video Experts Team (JVET) of ITU-T SG 16 WP 3 and ISO/IEC JTC 1/SC 29/WG 11, 18th Meeting: by teleconference, Apr. 15-24, 2020, 524 pages.

(Continued)

*Primary Examiner* — Chikaodili E Anyikire
(74) *Attorney, Agent, or Firm* — Fish & Richardson P.C.

(57) ABSTRACT

A multilayer-based image decoding method performed by a decoding device, according to the disclosure of the present document, comprises the steps of: obtaining image information including information related to a reference picture list from a bitstream; deriving the reference picture list on the basis of the information related to the reference picture list; generating prediction samples of a current block by performing prediction on the current block on the basis of a reference picture included in the reference picture list; and generating a reconstructed picture including reconstructed samples on the basis of the prediction samples.

14 Claims, 11 Drawing Sheets

(51) Int. Cl.
    *H04N 19/174*     (2014.01)
    *H04N 19/176*     (2014.01)

(56) References Cited

U.S. PATENT DOCUMENTS

| | | | |
|---|---|---|---|
| 2014/0294097 A1* | 10/2014 | Seregin | H04N 19/31 |
| | | | 375/240.26 |
| 2017/0034532 A1* | 2/2017 | Yamamoto | H04N 19/61 |
| 2020/0396445 A1* | 12/2020 | Seregin | H04N 19/105 |
| 2021/0314583 A1* | 10/2021 | Choi | H04N 19/503 |
| 2021/0368163 A1* | 11/2021 | Chen | H04N 19/58 |

OTHER PUBLICATIONS

Wang et al., "AHG9: Signalling and derivation of inter-layer RPS for HEVC 3DV and scalable extensions," JCTVC-M0269, Presented at Joint Collaborative Team on Video Coding (JCT-VC) of ITU-T SG 16 WP 3 and ISO/IEC JTC 1/SC 29/WG 11, 13th Meeting: Incheon, KR, Apr. 18-26, 2013, 5 pages.

\* cited by examiner

MULTILAYER-BASED IMAGE CODING METHOD IN VIDEO OR IMAGE CODING SYSTEM

CROSS-REFERENCE TO RELATED APPLICATIONS

This application is a National Stage application under 35 U.S.C. § 371 of International Application No. PCT/KR2021/005872, filed on May 11, 2021, which claims the benefit of U.S. Provisional Application No. 63/028,600, filed on May 22, 2020. The disclosures of the prior applications are incorporated by reference in their entirety.

BACKGROUND OF THE DISCLOSURE

Field of the Disclosure

The present document relates to a video/image coding technology and, most particularly, to a multi-layer based image coding method in a video or image coding system.

Related Art

Recently, the demand for high resolution, high quality image/video such as 4K or 8K Ultra High Definition (UHD) image/video is increasing in various fields. As the image/video resolution or quality becomes higher, relatively more amount of information or bits are transmitted than for conventional image/video data. Therefore, if image/video data are transmitted via a medium such as an existing wired/wireless broadband line or stored in a legacy storage medium, costs for transmission and storage are readily increased.

Moreover, interests and demand are growing for virtual reality (VR) and artificial reality (AR) contents, and immersive media such as hologram; and broadcasting of images/videos exhibiting image/video characteristics different from those of an actual image/video, such as game images/videos, are also growing.

Therefore, a highly efficient image/video compression technique is required to effectively compress and transmit, store, or play high resolution, high quality images/videos showing various characteristics as described above.

SUMMARY OF THE DISCLOSURE

Technical Solutions

An exemplary embodiment of the present document provides a method and apparatus for increasing video/image coding efficiency.

An exemplary embodiment of the present document provides a method and apparatus for signaling information related to a reference picture list.

An exemplary embodiment of the present document provides a method and apparatus for signaling information related to an inter-layer reference picture (ILRP).

An exemplary embodiment of the present document provides a method and apparatus for signaling delta ILRP index information.

An exemplary embodiment of the present document provides a video/image decoding method performed by a decoding apparatus.

An exemplary embodiment of the present document provides a decoding apparatus for performing a video/image decoding.

An exemplary embodiment of the present document provides a video/image encoding method performed by an encoding apparatus.

An exemplary embodiment of the present document provides an encoding apparatus for performing video/image encoding.

An exemplary embodiment of the present document provides a computer readable digital storage medium in which encoded video/image information generated by the vide/image encoding method disclosed in at least one of the exemplary embodiments of the present document is stored.

An exemplary embodiment of the present document provides a computer readable digital storage medium in which encoded information or encoded video/image information causing the vide/image decoding method disclosed in at least one of the exemplary embodiments of the present document to be performed by the decoding apparatus is stored.

Effects of the Disclosure

The exemplary embodiment of the present document may enhance the overall image/video compression efficiency.

The exemplary embodiment of the present document may signal the information related to the reference picture list.

The exemplary embodiment of the present document may signal information related to an inter-layer reference picture (ILRP).

By signaling delta ILRP index information, the exemplary embodiment of the present document may increase coding efficiency by minimizing a number of signaled bits.

By signaling delta ILRP index information, the exemplary embodiment of the present document may increase coding efficiency by enabling sharing of a sequence parameter set (SPS).

DESCRIPTION OF EXEMPLARY EMBODIMENTS

Figure 1:
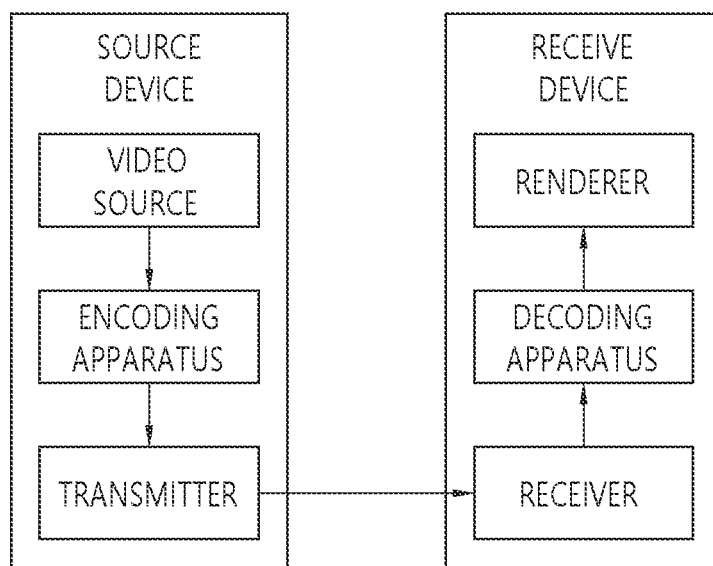
FIG. 1 schematically illustrates an example of a video/image coding system to which exemplary embodiments of the present document are applicable.

This document may be modified in various forms, and specific embodiments thereof will be described and shown in the drawings. However, the embodiments are not intended for limiting this document. The terms used in the following description are used to merely describe specific embodiments, but are not intended to limit this document. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Meanwhile, each of the components in the drawings described in this document are shown independently for the convenience of description regarding different characteristic functions, and do not mean that the components are implemented in separate hardware or separate software. For example, two or more of each configuration may be combined to form one configuration, or one configuration may be divided into a plurality of configurations. Embodiments in which each configuration is integrated and/or separated are also included in the scope of this document without departing from the spirit of this document.

Hereinafter, exemplary embodiments of this document will be described in detail with reference to the accompanying drawings. Hereinafter, the same reference numerals are used for the same components in the drawings, and redundant description of the same components may be omitted.

FIG. 1 schematically illustrates an example of a video/image coding system to which exemplary embodiments of the present document are applicable.

Referring to FIG. 1, a video/image coding system may include a first apparatus (a source device) and a second apparatus (a receiving device). The source device may deliver encoded video/image information or data in the form of a file or streaming to the receiving device via a digital storage medium or network.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input video/image. The encoding apparatus may perform a series of procedures such as prediction, transform, and quantization for compression and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

The present document relates to a video/image coding. For example, methods/exemplary embodiments disclosed in the present document are applicable to a method disclosed in a versatile video coding (VVC) standard. Further, the methods/exemplary embodiments disclosed in the present document are applicable to a method disclosed in an essential video coding (EVC) standard, an AOMedia Video 1 (AV1) standard, a 2nd generation of audio video coding (AVS2) standard, or a next-generation video/image coding standard (e.g., H.267 or H.268).

This document presents various embodiments of video/image coding, and the embodiments may be performed in combination with each other unless otherwise mentioned.

In the present document, a video may mean a group of a series of images over time. A picture generally means a unit representing one image in a specific time period, and a slice and a tile are units constituting a part of a picture in coding. The slice/tile may include one or more coding tree units (CTUs). One picture may be composed of one or more slices/tiles. A tile is a rectangular region of CTUs within a particular tile column and a particular tile row in a picture. The tile column is a rectangular region of CTUs having a height equal to the height of the picture and a width specified by syntax elements in the picture parameter set. The tile row is a rectangular region of CTUs having a height specified by syntax elements in the picture parameter set and a width equal to the width of the picture. A tile scan is a specific sequential ordering of CTUs partitioning a picture in which the CTUs are ordered consecutively in CTU raster scan in a tile whereas tiles in a picture are ordered consecutively in a raster scan of the tiles of the picture. A slice includes an integer number of complete tiles or an integer number of consecutive complete CTU rows within a tile of a picture that may be exclusively contained in a single NAL unit.

Meanwhile, one picture may be divided into two or more subpictures. The subpicture may be a rectangular region of one or more slices within a picture.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (ex., Cb, cr) blocks. The unit may be used interchangeably with terms such as block or area in some cases. In a general case, an M×N block may include samples (or sample arrays) or a set (or array) of transform coefficients of M columns and N rows.

In the present document, "A or B" may mean "only A", "only B", or "both A and B". In other words, in the present document, "A or B" may be interpreted as "A and/or B". For example, in the present document, "A, B, or C" may mean "only A", "only B", "only C", or "any combination of A, B, and C".

A slash (/) or a comma used in the present document may mean "and/or". For example, "A/B" may mean "A and/or B". Therefore, "A/B" may mean "only A", "only B", or "both A and B". For example, "A, B, C" may mean "A, B, or C".

In the present document, "at least one of A and B" may mean "only A", "only B", or "both A and B". Further, in the present document, expressions of "at least one of A or B" or "at least one of A and/or B" may be interpreted the same as "at least one of A and B".

Further, in the present document, "at least one of A, B, and C" may mean "only A", "only B", "only C", or "any combination of A, B, and C". Further, "at least one of A, B, or C" or "at least one of A. B, and/or C" may mean "at least one of A, B, and C".

Further, a parenthesis used in the present document may mean "for example". Specifically, if it is indicated by a "prediction (intra prediction)", an "intra prediction" may be proposed as an example of the "prediction". In other words, the "prediction" in the present document is not limited to the "intra prediction", and the "intra prediction" may be proposed as the example of the "prediction". Further, even if it is indicated by a "prediction (i.e., intra prediction)", the "intra prediction" may be proposed as the example of the "prediction".

In the present document, a technical feature individually described in one drawing may also be individually implemented, and also be simultaneously implemented.

Figure 2:
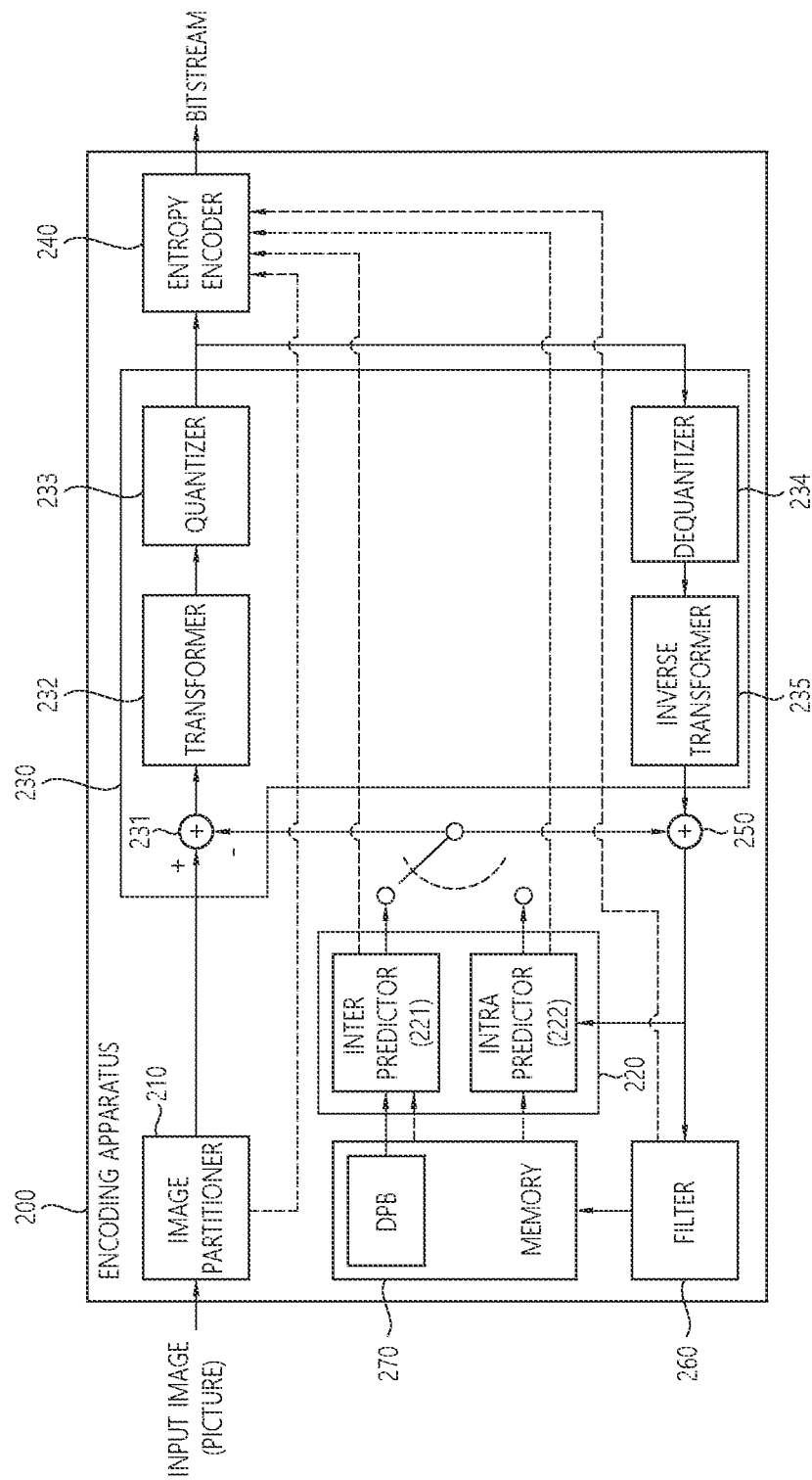
FIG. 2 is a diagram for schematically explaining a configuration of a video/image encoding apparatus to which exemplary embodiments of the present document are applicable.

FIG. 2 is a diagram for schematically explaining a configuration of a video/image encoding apparatus to which exemplary embodiments of the present document are applicable. Hereinafter, the encoding apparatus may include an image encoding apparatus and/or a video encoding apparatus.

Referring to FIG. 2, the encoding apparatus 200 includes an image partitioner 210, a predictor 220, a residual processor 230, and an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or a reconstructed block generator. The image partitioner 210, the predictor 220, the residual processor 230, the entropy encoder 240, the adder 250, and the filter 260 may be configured by at least one hardware component (ex. An encoder chipset or processor) according to an embodiment. In addition, the memory 270 may include a decoded picture buffer (DPB) or may be configured by a digital storage medium. The hardware component may further include the memory 270 as an internal/external component.

The image partitioner 210 may partition an input image (or a picture or a frame) input to the encoding apparatus 200 into one or more processors. For example, the processor may be called a coding unit (CU). In this case, the coding unit may be recursively partitioned according to a quad-tree binary-tree ternary-tree (QTBTTT) structure from a coding tree unit (CTU) or a largest coding unit (LCU). For example, one coding unit may be partitioned into a plurality of coding units of a deeper depth based on a quad tree structure, a binary tree structure, and/or a ternary structure. In this case, for example, the quad tree structure may be applied first and the binary tree structure and/or ternary structure may be applied later. Alternatively, the binary tree structure may be applied first. The coding procedure according to this document may be performed based on the final coding unit that is no longer partitioned. In this case, the largest coding unit may be used as the final coding unit based on coding efficiency according to image characteristics, or if necessary, the coding unit may be recursively partitioned into coding units of deeper depth and a coding unit having an optimal size may be used as the final coding unit. Here, the coding procedure may include a procedure of prediction, transform, and reconstruction, which will be described later. As another example, the processor may further include a prediction unit (PU) or a transform unit (TU). In this case, the prediction unit and the transform unit may be split or partitioned from the aforementioned final coding unit. The prediction unit may be a unit of sample prediction, and the transform unit may be a unit for deriving a transform coefficient and/or a unit for deriving a residual signal from the transform coefficient.

The unit may be used interchangeably with terms such as block or area in some cases. In a general case, an M×N block may represent a set of samples or transform coefficients composed of M columns and N rows. A sample may generally represent a pixel or a value of a pixel, may represent only a pixel/pixel value of a luma component or represent only a pixel/pixel value of a chroma component. A sample may be used as a term corresponding to one picture (or image) for a pixel or a pel.

In the encoding apparatus 200, a prediction signal (predicted block, prediction sample array) output from the inter predictor 221 or the intra predictor 222 is subtracted from an input image signal (original block, original sample array) to generate a residual signal (residual block, residual sample array), and the generated residual signal is transmitted to the transformer 232. In this case, as shown, a part for subtracting a prediction signal (predicted block, prediction sample array) from the input image signal (original block, original sample array) in the encoder 200 may be called a subtractor 231. The predictor may perform prediction on a block to be processed (hereinafter, referred to as a current block) and generate a predicted block including prediction samples for the current block. The predictor may determine whether intra prediction or inter prediction is applied on a current block or CU basis. As described later in the description of each prediction mode, the predictor may generate various kinds of information related to prediction, such as prediction mode information, and transmit the generated information to the entropy encoder 240. The information on the prediction may be encoded in the entropy encoder 240 and output in the form of a bitstream.

The intra predictor 222 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 222 may determine the prediction mode applied to the current block by using a prediction mode applied to a neighboring block.

The inter predictor 221 may derive a predicted block for the current block based on a reference block (reference sample array) specified by a motion vector on a reference picture. Here, in order to reduce the amount of motion information transmitted in the inter prediction mode, the motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, the inter predictor 221 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion vector prediction (MVP) mode, the motion vector of the neighboring block may be used as a motion vector predictor and the motion vector of the current block may be indicated by signaling a motion vector difference.

The predictor 220 may generate a prediction signal based on various prediction methods described below. For example, the predictor may not only apply intra prediction or inter prediction to predict one block but also simultaneously apply both intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in this document. The palette mode may be considered as an example of intra coding or intra prediction. When the palette mode is applied, a sample value within a picture may be signaled based on information on the palette table and the palette index.

The prediction signal generated by the predictor (including the inter predictor 221 and/or the intra predictor 222) may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a graph-based transform (GBT), or a conditionally non-linear transform (CNT). Here, the GBT means transform obtained from a graph when relationship information between pixels is represented by the graph. The CNT refers to transform generated based on a prediction signal generated using all previously reconstructed pixels. In addition, the transform process may be applied to square pixel blocks having the same size or may be applied to blocks having a variable size rather than square.

The quantizer 233 may quantize the transform coefficients and transmit them to the entropy encoder 240 and the entropy encoder 240 may encode the quantized signal (information on the quantized transform coefficients) and output a bitstream. The information on the quantized transform coefficients may be referred to as residual information. The quantizer 233 may rearrange block type quantized transform coefficients into a one-dimensional vector form based on a coefficient scanning order and generate information on the quantized transform coefficients based on the quantized transform coefficients in the one-dimensional vector form. Information on transform coefficients may be generated. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (ex. values of syntax elements, etc.) together or separately. Encoded information (ex. Encoded video/image information) may be transmitted or stored in units of NALs (network abstraction layer) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. In this document, information and/or syntax elements transmitted/signaled from the encoding apparatus to the decoding apparatus may be included in video/picture information. The video/image information may be encoded through the above-described encoding procedure and included in the bitstream. The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 240 and/or a storage (not shown) storing the signal may be included as internal/external element of the encoding apparatus 200, and alternatively, the transmitter may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transformer 235. The adder 250 adds the reconstructed residual signal to the prediction signal output from the inter predictor 221 or the intra predictor 222 to generate a reconstructed signal (reconstructed picture, reconstructed block, reconstructed sample array). If there is no residual for the block to be processed, such as a case where the skip mode is applied, the predicted block may be used as the reconstructed block. The adder 250 may be called a reconstructor or a reconstructed block generator The generated reconstructed signal may be used for intra prediction of a next block to be processed in the current picture and may be used for inter prediction of a next picture through filtering as described below.

Meanwhile, luma mapping with chroma scaling (LMCS) may be applied during picture encoding and/or reconstruction.

The filter 260 may improve subjective/objective image quality by applying filtering to the reconstructed signal. For example, the filter 260 may generate a modified reconstructed picture by applying various filtering methods to the reconstructed picture and store the modified reconstructed picture in the memory 270, specifically, a DPB of the memory 270. The various filtering methods may include, for example, deblocking filtering, a sample adaptive offset, an adaptive loop filter, a bilateral filter, and the like. The filter 260 may generate various kinds of information related to the filtering and transmit the generated information to the entropy encoder 240 as described later in the description of each filtering method. The information related to the filtering may be encoded by the entropy encoder 240 and output in the form of a bitstream.

The modified reconstructed picture transmitted to the memory 270 may be used as the reference picture in the inter predictor 221. When the inter prediction is applied through the encoding apparatus, prediction mismatch between the encoding apparatus 200 and the decoding apparatus may be avoided and encoding efficiency may be improved.

The DPB of the memory 270 DPB may store the modified reconstructed picture for use as a reference picture in the inter predictor 221. The memory 270 may store the motion information of the block from which the motion information in the current picture is derived (or encoded) and/or the motion information of the blocks in the picture that have already been reconstructed. The stored motion information may be transmitted to the inter predictor 221 and used as the motion information of the spatial neighboring block or the motion information of the temporal neighboring block. The memory 270 may store reconstructed samples of reconstructed blocks in the current picture and may transfer the reconstructed samples to the intra predictor 222.

Meanwhile, image/video coding according to the present disclosure may include multilayer-based image/video coding. The multilayer-based image/video coding may include scalable coding. The multilayer-based coding or scalable coding may process input signals for each layer. Input signals (input image/picture) may differ in at least one of resolution, frame rate, bit-depth, color format, aspect ratio, and view depending on the layers. In this case, it is possible to reduce repeated transmission/processing of information and increase compression efficiency by performing prediction between layers using a difference between layers, namely, based on scalability.

Figure 3:
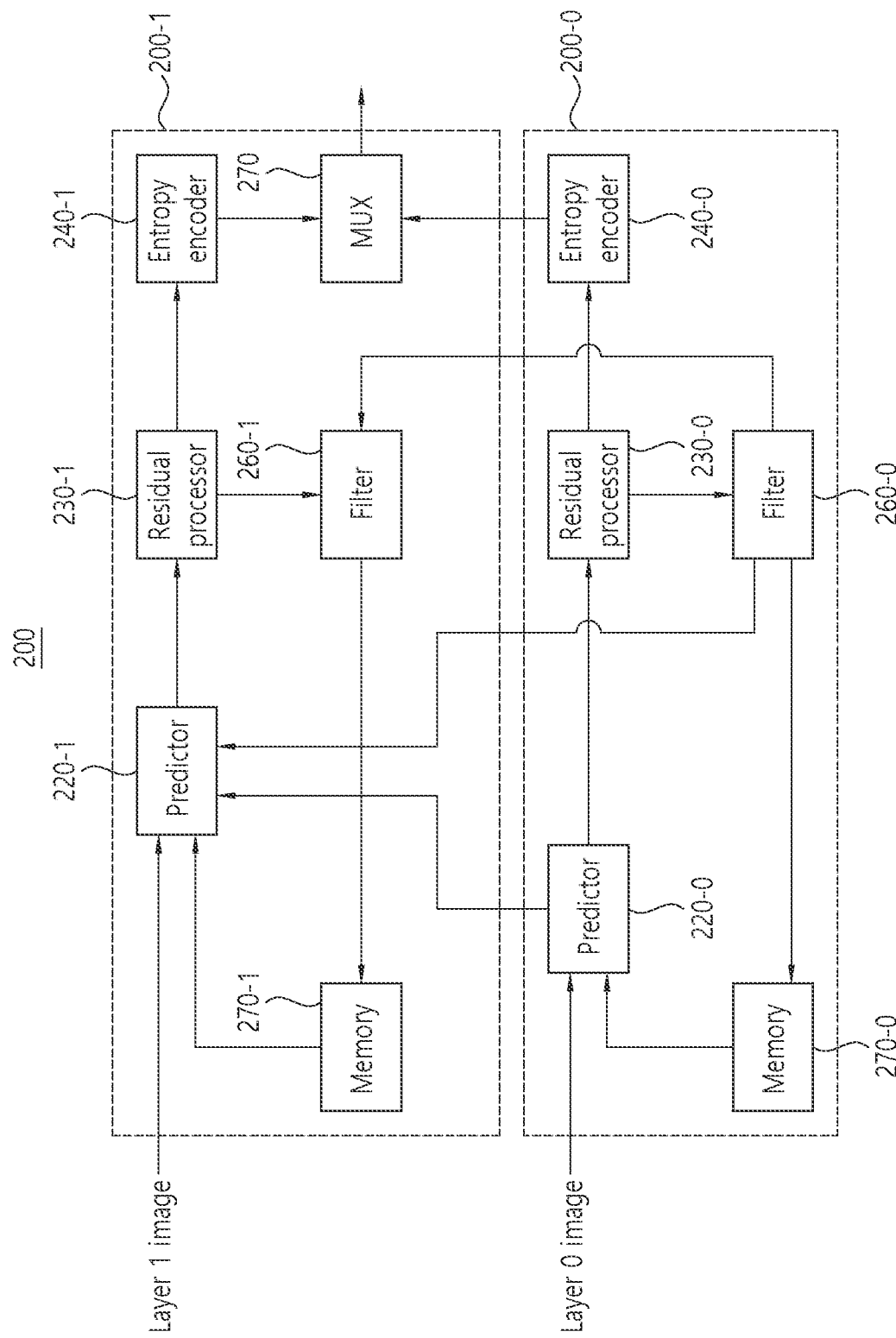
FIG. 3 is a diagram for schematically describing a configuration of a multi-layer based video/image encoding apparatus to which exemplary embodiments of the present document are applicable.

FIG. 3 is a diagram for schematically describing a configuration of a multi-layer based video/image encoding apparatus to which exemplary embodiments of the present document are applicable. The encoding apparatus of FIG. 3 may include the encoding apparatus of FIG. 2. In FIG. 3, the image partitioner and the adder are omitted. However, the encoding apparatus may include the image partitioner and the adder. In this case, the image partitioner and the adder may be included in layer units. This diagram will be described mostly based on multi-layer based prediction. Hereinafter, multilayer may be interchangeably used with multiple layers.

In FIG. 3, a multilayer structure consisting of two layers will be given as an example and described for simplicity in the description. However, embodiments of the present document (or specification) will not be limited only to the given example, and the multilayer structure to which the embodiments of the present specification are applied may include two or more layers.

Referring to FIG. 3, the encoding apparatus 200 includes an encoder 200-1 for layer 1 and an encoder 200-0 for layer 0.

Layer 0 may be a base layer, a reference layer, or a lower layer; layer 1 may be an enhancement layer, a current layer, or a higher layer.

The encoder 200-1 of layer 1 includes a predictor 220-1, a residual processor 230-1, a filter 260-1, a memory 270-1, an entropy encoder 240-1, and a multiplexer (MUX) 270. The MUX may be included as an external component.

The encoder 200-0 of layer 0 includes a predictor 220-0, a residual processor 230-0, a filter 260-0, a memory 270-0, and an entropy encoder 240-0.

The predictor 220-0, 220-1 may perform prediction on the input image based on various prediction techniques as described above. For example, the predictor 220-0, 220-1 may perform inter prediction and intra prediction. The predictor 220-0, 220-1 may perform prediction in predetermined processing units. A prediction unit may be a coding unit (CU) or a transform unit (TU). A predicted block (including prediction samples) may be generated according to a prediction result, and the residual processor may derive a residual block (including residual samples) based on the predicted block.

Through inter prediction, a prediction block may be generated by performing prediction based on the information on at least one of a preceding picture and/or a succeeding picture of the current picture. Through intra prediction, a prediction block may be generated by performing prediction based on neighboring samples within the current picture.

Various prediction mode methods described above may be used for an inter prediction mode or method. Inter prediction may select a reference picture with respect to a current block to be predicted and a reference block related to the current block within the reference picture. The predictor 220-0, 220-1 may generate a predicted block based on the reference block.

Also, the predictor 320-1 may perform prediction on layer 1 using the information of layer 0. In the present disclosure, a method of predicting information of a current layer using the information of another layer is referred to as inter-layer prediction for the convenience of description.

Information of the current layer predicted based on the information of another layer (i.e., predicted by inter-layer prediction) includes at least one of texture, motion information, unit information, and predetermined parameters (e.g., filtering parameters).

Also, information of another layer used for prediction of the current layer (i.e., used for inter-layer prediction) may include at least one of texture, motion information, unit information, and predetermined parameters (e.g., filtering parameters).

In inter-layer prediction, a current block may be a block within the current picture of a current layer (e.g., layer 1) and may be a coding target block. As a block within a picture (reference picture) belonging to the same access unit (AU) as the picture (current picture) to which the current block belongs in a layer (reference layer, e.g., layer 0) that is being referenced for prediction of the current block, a reference block may be a block corresponding to the current block.

One example of inter-layer prediction is inter-layer motion prediction that predicts motion information of a current layer using motion information of a reference layer. According to inter-layer motion prediction, motion information of a current block may be predicted based on the motion information of a reference block. In other words, in deriving motion information based on the inter prediction mode to be described later, a motion information candidate may be derived using the motion information of an inter-layer reference block instead of a temporal neighboring block.

When inter-layer motion prediction is applied, the predictor 220-1 may scale and use the reference block (i.e., inter-layer reference block) motion information of the reference layer.

In another example of inter-layer prediction, inter-layer texture prediction may use the texture of a reconstructed reference block as a prediction value for the current block. In this case, the predictor 220-1 may scale the texture of the reference block through upsampling. Inter-layer texture prediction may be called inter-layer (reconstructed) sample prediction or simply inter-layer prediction.

In inter-layer parameter prediction, which is yet another example of inter-layer prediction, a parameter derived from the reference layer may be reused in the current layer, or a parameter for the current layer may be derived based on the parameter used in the reference layer.

In inter-layer residual prediction, which is still another example of inter-layer prediction, residuals of the current layer may be predicted using residual information of another layer, and prediction for the current block may be performed based on the predicted residuals.

In inter-layer differential prediction, which is yet still another example of inter-layer prediction, prediction for the current block may be performed using a difference between images obtained by upsampling or downsampling of a reconstructed picture of the current layer and a reconstructed picture of the reference layer.

In inter-layer syntax prediction, which is still yet another example of inter-layer prediction, the texture of a current block may be predicted or generated using syntax information of the reference layer. In this case, the syntax information of the referenced reference layer may include information on the intra prediction mode and motion information.

When predicting a specific block, a plurality of prediction methods using the inter-layer prediction may use multiple layers.

Here, as examples of inter-layer prediction, inter-layer texture prediction, inter-layer motion prediction, inter-layer unit information prediction, inter-layer parameter prediction, inter-layer residual prediction, inter-layer differential prediction, and inter-layer syntax prediction have been described; however, inter-layer prediction applicable to the present disclosure is not limited to the examples above.

For example, inter-layer prediction may be applied as an extension of inter prediction for the current layer. In other words, inter prediction for the current block may be performed by including a reference picture derived from the reference layer in the reference pictures that may be referenced for inter prediction of the current block.

In this case, the inter-layer reference picture may be included in a reference picture list for the current block.

Using the inter-layer reference picture, the predictor 320-1 may perform inter prediction on the current block.

Here, the inter-layer reference picture may be a reference picture constructed by sampling a reconstructed picture of the reference layer to correspond to the current layer. Therefore, when the reconstructed picture of the reference layer corresponds to a picture of the current layer, the reconstructed picture of the reference layer may be used as the inter-layer reference picture without sampling. For example, when the width and height of samples in a reconstructed picture of the reference layer are the same as those of samples in a reconstructed picture of the current layer; and the offsets between the upper left, upper right, lower left, and lower right of a picture of the reference layer and the upper left, upper right, lower left, and lower right of a picture of the current layer are 0, the reconstructed picture of the reference layer may be used as the inter-layer reference picture of the current layer without re-sampling.

Also, the reconstructed picture of the reference layer from which the inter-layer reference picture is derived may be a picture belonging to the same AU as the current picture to be encoded.

When inter prediction for the current block is performed by including an inter-layer reference picture in the reference picture list, the positions of the inter-layer reference picture within the reference picture list L0 and L1 may be different from each other. For example, in the case of the reference picture list L0, the inter-layer reference picture may be located after short-term reference pictures before the current picture, and in the case of the reference picture list L1, the inter-layer reference picture may be located at the end of the reference picture list.

Here, the reference picture list L0 is a reference picture list used for inter prediction of a P slice or a reference picture list used as a first reference picture list in inter prediction of a B slice. The reference picture list L1 is a second reference picture list used for inter prediction of a B slice.

Therefore, the reference picture list L0 may be composed in the order of a short-term reference picture(s) before the current picture, an inter-layer reference picture, a short-term reference picture(s) after the current picture, and a long-term reference picture. The reference picture list L1 may be composed in the order of a short-term reference picture(s) after the current picture, a short-term reference picture(s) before the current picture, a long-term reference picture, and an inter-layer reference picture.

At this time, a predictive slice (P slice) is a slice on which intra prediction is performed or inter prediction is performed using up to one motion vector and reference picture index per prediction block. A bi-predictive slice (B slice) is a slice on which intra prediction is performed, or prediction is performed using up to two motion vectors and reference picture indexes per prediction block. In this regard, an intra slice (I slice) is a slice to which only intra prediction is applied.

Also, when inter prediction for the current block is performed based on the reference picture list including an inter-layer reference picture, the reference picture list may include a plurality of inter-layer reference pictures derived from a plurality of layers.

When the reference picture list includes a plurality of inter-layer reference pictures, inter-layer reference pictures may be cross-arranged within the reference picture list L0 and L1. For example, suppose that two inter-layer reference pictures, an inter-layer reference picture $ILRP_i$, and an inter-layer reference picture $ILRP_g$ are included in the reference picture list used for inter prediction of the current block. In this case, in the reference picture list L0, $ILRP_i$ may be located after short-term reference pictures before the current picture, and $ILRP_g$ may be located at the end of the list. Also, in the reference picture list L1, $ILRP_j$ may be located at the end of the list, and $ILRP_j$ may be located after short-term reference pictures after the current picture.

In this case, the reference picture list L0 may be composed in the order of the short-term reference picture(s) before the current picture, the inter-layer reference picture $ILRP_j$, the short-term reference picture(s) after the current picture, the long-term reference picture, and the inter-layer reference picture $ILRP_j$. The reference picture list L1 may be composed in the order of the short-term reference picture(s) after the current picture, the inter-layer reference picture $ILRP_j$, the short-term reference picture(s) before the current picture, the long-term reference picture, and the inter-layer reference picture $ILRP_j$.

Also, one of the two inter-layer reference pictures may be an inter-layer reference picture derived from a scalable layer related to resolution, and the other may be an inter-layer reference picture derived from a layer providing a different view. In this case, for example, suppose $ILRP_j$ is an inter-layer reference picture derived from a layer that provides a different resolution, and $ILRP_j$ is an inter-layer reference picture derived from a layer that provides a different view. Then, in the case of scalable video coding that supports only scalability except for a view, the reference picture list L0 may be composed in the order of the short-term reference picture(s) before the current picture, the inter-layer reference picture $ILRP_j$, the short-term reference picture(s) after the current picture, and the long-term reference picture. On the other hand, the reference picture list L1 may be composed in the order of the short-term reference picture(s) after the current picture, the short-term reference picture(s) before the current picture, the long-term reference picture, and the inter-layer reference picture $ILRP_j$.

Meanwhile, for inter-layer prediction, the information of an inter-layer reference picture may be composed of only a sample value, only motion information (motion vector), or both the sample value and the motion information. When the reference picture index indicates the inter-layer reference picture, the predictor 220-1 uses only the sample value of the inter-layer reference picture, motion information (motion vector) of the inter-layer reference picture, or both of the sample value and the motion information of the inter-layer reference picture according to the information received from the encoding apparatus.

When only the sample values of the inter-layer reference picture are used, the predictor 220-1 may derive samples of a block specified by a motion vector in the inter-layer reference picture as prediction samples of the current block. In the case of scalable video coding that does not consider a view, the motion vector in inter prediction (inter-layer prediction) using the inter-layer reference picture may be set to a fixed value (for example, 0).

When only the motion information of an inter-layer reference picture is used, the predictor 220-1 may use a motion vector specified in the inter-layer reference picture as a motion vector predictor for deriving the motion vector of the current block. Also, the predictor 220-1 may use a motion vector specified in the inter-layer reference picture as the motion vector of the current block.

When both the samples and the motion information of the inter-layer reference picture are used, the predictor 220-1 may use the samples related to the current block in the inter-layer reference picture and the motion information (motion vector) specified in the inter-layer reference picture for prediction of the current block.

When inter-layer prediction is applied, the encoding apparatus may transmit a reference index indicating an inter-layer reference picture within the reference picture list to the decoding apparatus and also transmit, to the decoding apparatus, information that specifies which information (sample information, motion information, or sample information and motion information) to use from the inter-layer reference picture, namely, information that specifies dependency type of the dependency related to the inter-layer prediction between two layers.

Figure 4:
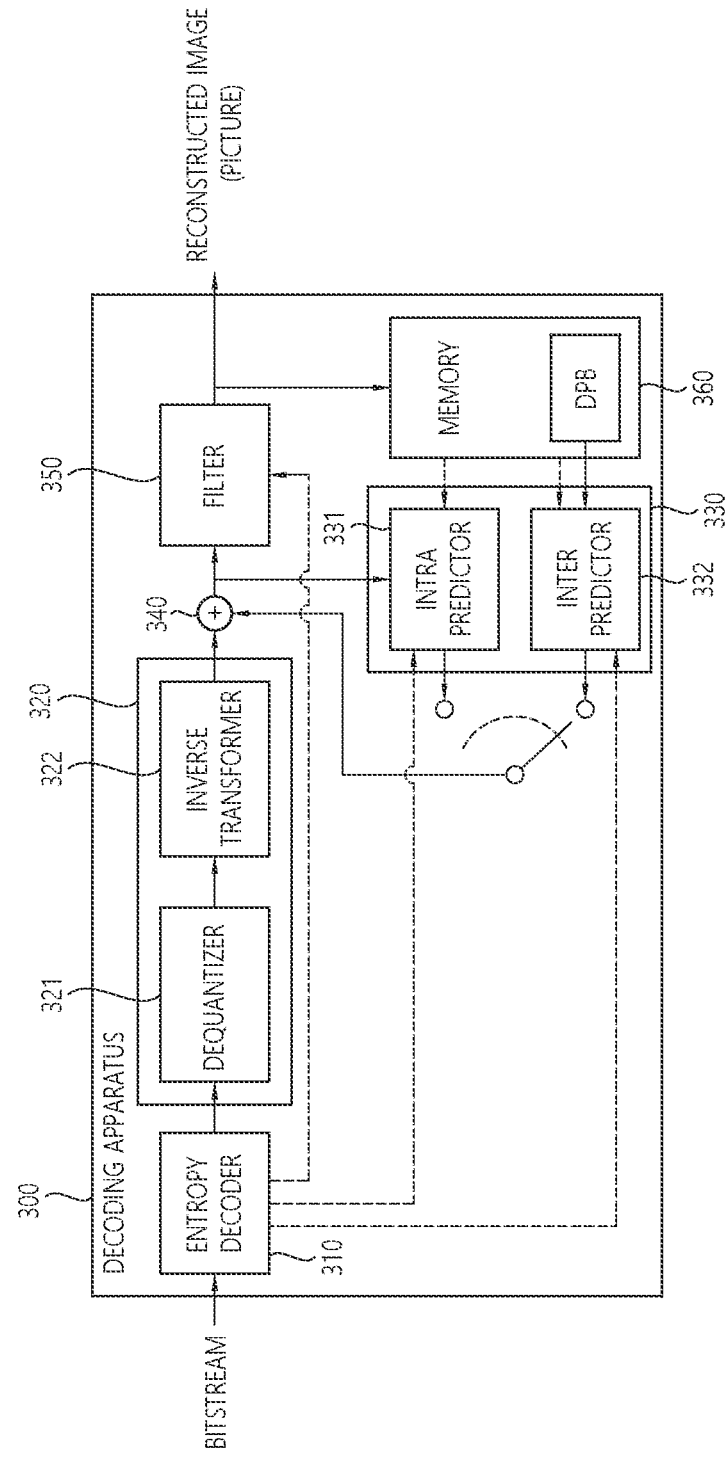
FIG. 4 is a diagram schematically explaining a configuration of a video/image decoding apparatus to which exemplary embodiments of the present document are applicable.

FIG. 4 is a diagram schematically explaining a configuration of a video/image decoding apparatus to which exemplary embodiments of the present document are applicable. Hereinafter, the decoding apparatus may include an image decoding apparatus and/or a video decoding apparatus.

Referring to FIG. 4, the decoding apparatus 300 may include an entropy decoder 310, a residual processor 320, a predictor 330, an adder 340, a filter 350, and a memory 360. The predictor 330 may include an inter predictor 331 and an intra predictor 332. The residual processor 320 may include a dequantizer 321 and an inverse transformer 321. The entropy decoder 310, the residual processor 320, the predictor 330, the adder 340, and the filter 350 may be configured by a hardware component (ex. A decoder chipset or a processor) according to an embodiment. In addition, the memory 360 may include a decoded picture buffer (DPB) or may be configured by a digital storage medium. The hardware component may further include the memory 360 as an internal/external component.

When a bitstream including video/image information is input, the decoding apparatus 300 may reconstruct an image corresponding to a process in which the video/image information is processed in the encoding apparatus of FIG. 2. For example, the decoding apparatus 300 may derive units/blocks based on block partition related information obtained from the bitstream. The decoding apparatus 300 may perform decoding using a processor applied in the encoding apparatus. Thus, the processor of decoding may be a coding unit, for example, and the coding unit may be partitioned according to a quad tree structure, binary tree structure and/or ternary tree structure from the coding tree unit or the largest coding unit. One or more transform units may be derived from the coding unit. The reconstructed image signal decoded and output through the decoding apparatus 300 may be reproduced through a reproducing apparatus.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (ex, video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information on the parameter set and/or the general constraint information. Signaled/received information and/or syntax elements described later in this document may be decoded may decode the decoding procedure and obtained from the bitstream. For example, the entropy decoder 310 decodes the information in the bitstream based on a coding method such as exponential Golomb coding, CAVLC, or CABAC, and output syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 310 may be provided to the predictor (the inter predictor 332 and the intra predictor 331), and the residual value on which the entropy decoding was performed in the entropy decoder 310, that is, the quantized transform coefficients and related parameter information, may be input to the residual processor 320. The residual processor 320 may derive the residual signal (the residual block, the residual samples, the residual sample array). In addition, information on filtering among information decoded by the entropy decoder 310 may be provided to the filter 350. Meanwhile, a receiver (not shown) for receiving a signal output from the encoding apparatus may be further configured as an internal/external element of the decoding apparatus 300, or the receiver may be a component of the entropy decoder 310. Meanwhile, the decoding apparatus according to this document may be referred to as a video/image/picture decoding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients and output the transform coefficients. The dequantizer 321 may rearrange the quantized transform coefficients in the form of a two-dimensional block form. In this case, the rearrangement may be performed based on the coefficient scanning order performed in the encoding apparatus. The dequantizer 321 may perform dequantization on the quantized transform coefficients by using a quantization parameter (ex. quantization step size information) and obtain transform coefficients.

The inverse transformer 322 inversely transforms the transform coefficients to obtain a residual signal (residual block, residual sample array).

The predictor 330 may perform prediction on the current block and generate a predicted block including prediction samples for the current block. The predictor 330 may determine whether intra prediction or inter prediction is applied to the current block based on the information on the prediction output from the entropy decoder 310 and may determine a specific intra/inter prediction mode.

The predictor 330 may generate a prediction signal based on various prediction methods described below. For example, the predictor 330 may not only apply intra prediction or inter prediction to predict one block but also simultaneously apply intra prediction and inter prediction. This may be called combined inter and intra prediction (CIIP). In addition, the predictor 330 may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in this document. The palette mode may be considered as an example of intra coding or intra prediction. When the palette mode is applied, a sample value within a picture may be signaled based on information on the palette table and the palette index.

The intra predictor 331 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The intra predictor 331 may determine the prediction mode applied to the current block by using a prediction mode applied to a neighboring block. The intra predictor 331 may predict the current block by referring to the samples in the current picture. The referenced samples may be located in the neighborhood of the current block or may be located apart according to the prediction mode. In intra prediction, prediction modes may include a plurality of non-directional modes and a plurality of directional modes. The intra predictor 331 may determine the prediction mode applied to the current block by using the prediction mode applied to the neighboring block.

The inter predictor 332 may derive a predicted block for the current block based on a reference block (reference sample array) specified by a motion vector on a reference picture. In this case, in order to reduce the amount of motion information transmitted in the inter prediction mode, motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter predictor 332 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 340 may generate a reconstructed signal (reconstructed picture, reconstructed block, reconstructed sample array) by adding the obtained residual signal to the prediction signal (predicted block, prediction sample array) output from the predictor (including the inter predictor 332 and/or the intra predictor 331). If there is no residual for the block to be processed, such as when the skip mode is applied, the predicted block may be used as the reconstructed block.

The adder 340 may be called reconstructor or a reconstructed block generator. The generated reconstructed signal may be used for intra prediction of a next block to be processed in the current picture, may be output through filtering as described below, or may be used for inter prediction of a next picture.

Meanwhile, luma mapping with chroma scaling (LMCS) may be applied in the picture decoding process.

The filter 350 may improve subjective/objective image quality by applying filtering to the reconstructed signal. For example, the filter 350 may generate a modified reconstructed picture by applying various filtering methods to the reconstructed picture and store the modified reconstructed picture in the memory 360, specifically, a DPB of the memory 360. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter predictor 332. The memory 360 may store the motion information of the block from which the motion information in the current picture is derived (or decoded) and/or the motion information of the blocks in the picture that have already been reconstructed. The stored motion information may be transmitted to the inter predictor 332 so as to be utilized as the motion information of the spatial neighboring block or the motion information of the temporal neighboring block. The memory 360 may store reconstructed samples of reconstructed blocks in the current picture and transfer the reconstructed samples to the intra predictor 331.

In this document, the embodiments described in the filter 260, the inter predictor 221, and the intra predictor 222 of the encoding apparatus 200 may be the same as or respectively applied to correspond to the filter 350, the inter predictor 332, and the intra predictor 331 of the decoding apparatus 300. The same may also apply to the inter predictor 332 and the intra predictor 331.

As described above, in performing video coding, a prediction is performed to enhance compression efficiency. A predicted block including prediction samples for a current block, that is, a target coding block, may be generated through the prediction. In this case, the predicted block includes the prediction samples in a spatial domain (or pixel domain). The predicted block is identically derived in the encoding apparatus and the decoding apparatus. The encoding apparatus may enhance image coding efficiency by signaling, to the decoding apparatus, information on a residual (residual information) between the original block not an original sample value itself of the original block and the predicted block. The decoding apparatus may derive a residual block including residual samples based on the residual information, may generate a reconstructed including reconstructed samples by adding the residual block and the predicted block, and may generate a reconstructed picture including the reconstructed blocks.

The residual information may be generated through a transform and quantization procedure. For example, the encoding apparatus may derive the residual block between the original block and the predicted block, may derive transform coefficients by performing a transform procedure on the residual samples (residual sample array) included in the residual block, may derive quantized transform coefficients by performing a quantization procedure on the transform coefficients, and may signal related residual information to the decoding apparatus (through a bitstream). In this case, the residual information may include information, such as value information, location information, transform scheme, transform kernel, and quantization parameter of the quantized transform coefficients. The decoding apparatus may perform a dequantization/inverse transform procedure based on the residual information, and may derive residual samples (or residual block). The decoding apparatus may generate a reconstructed picture based on the predicted block and the residual block. Furthermore, the encoding apparatus may derive a residual block by dequantizing/inverse-transforming the quantized transform coefficients for reference to the inter prediction of a subsequent picture, and may generate a reconstructed picture.

In the present document, at least one of the quantization/the dequantization and/or the transform/the inverse transform may be omitted. If the quantization/dequantization are omitted, the quantized transform coefficient may be referred to as a transform coefficient. If the transform/the inverse transform are omitted, the transform coefficient may also be referred to as a coefficient or a residual coefficient, or for unity of expression, also be still referred to as the transform coefficient.

Further, in the present document, the quantized transform coefficient and the transform coefficient may be referred to as a transform coefficient and a scaled transform coefficient, respectively. In this case, the residual information may include information about the transform coefficient(s), and the information about the transform coefficient(s) may be signaled through a residual coding syntax. The transform coefficients may be derived based on the residual information (or the information about the transform coefficient(s)), and the scaled transform coefficients may be derived through the inverse transform (scaling) for the transform coefficients. The residual samples may be derived based on the inverse transform (transform) for the scaled transform coefficients. This may be likewise applied to/expressed in other parts of the present document.

Meanwhile, image/video decoding according to the present disclosure may include multilayer-based image/video coding. The multilayer-based image/video coding may include scalable coding. The multilayer-based coding or scalable coding may process input signals for each layer. Input signals (input image/picture) may differ in at least one of resolution, frame rate, bit-depth, color format, aspect ratio, and view depending on the layers. In this case, it is possible to reduce repeated transmission/processing of information and increase compression efficiency by performing prediction between layers using a difference between layers, namely, based on scalability.

Figure 5:
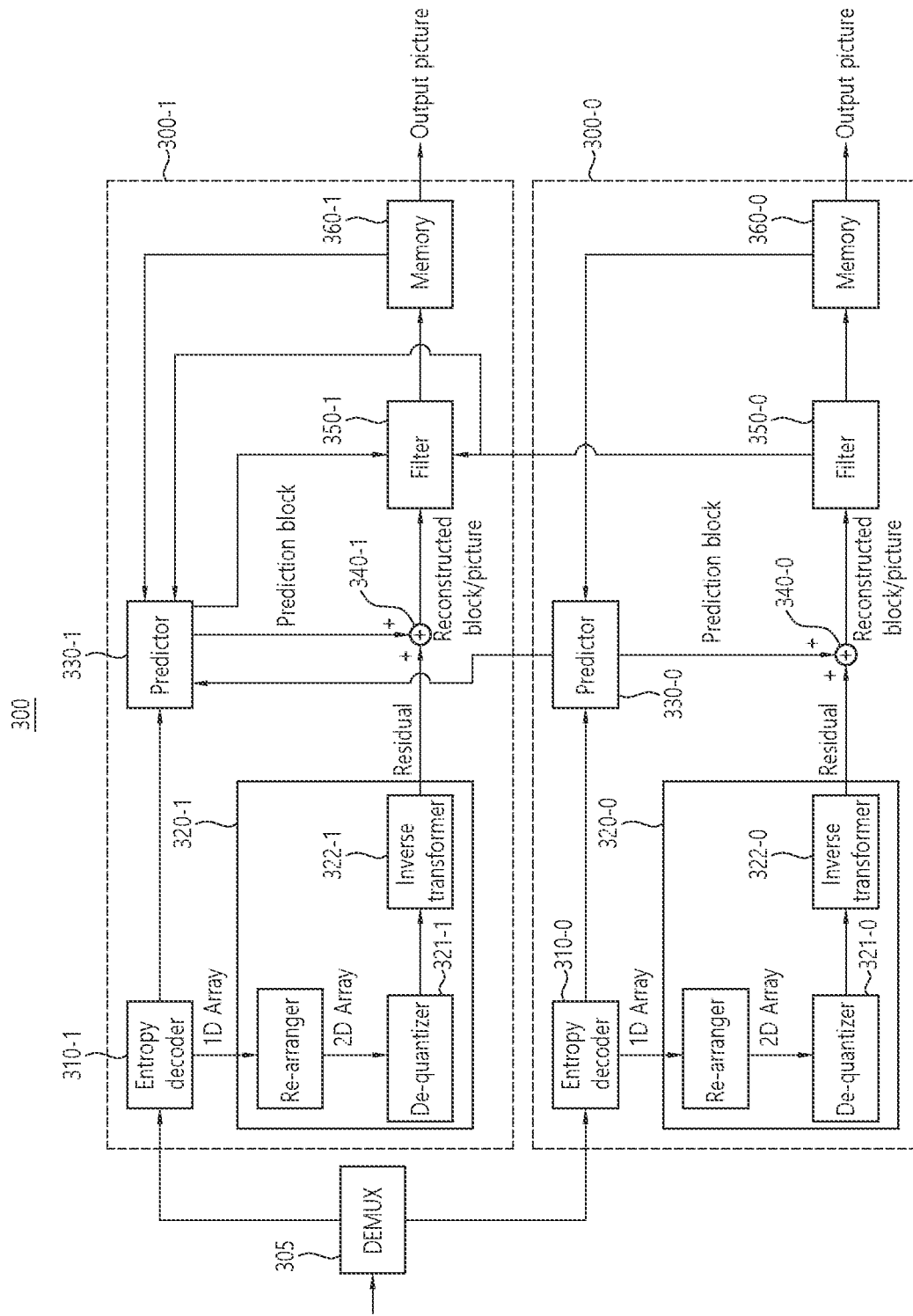
FIG. 5 is a diagram for schematically describing a configuration of a multi-layer based video/image encoding apparatus to which exemplary embodiments of the present document are applicable.

FIG. 5 is a diagram for schematically describing a configuration of a decoding apparatus performing decoding of multi-layer based video/image signals, and to which an exemplary embodiment(s) of the present document is(/are) applicable. The decoding apparatus of FIG. 5 may include the decoding apparatus of FIG. 4. In FIG. 5, a re-arranger may be omitted or included in a de-quantizer. This diagram will be described mostly based on multi-layer based prediction.

In FIG. 5, a multilayer structure consisting of two layers will be given as an example and described for simplicity in the description. However, embodiments of the present document (or specification) will not be limited only to the given example, and the multilayer structure to which the embodiments of the present specification are applied may include two or more layers.

Referring to FIG. 5, the decoding apparatus 300 includes a decoder 300-1 for layer 1 and a decoder 300-0 for layer 0.

The decoder 300-1 of layer 1 may include an entropy decoder 310-1, a residual processor 320-1, a predictor 330-1, an adder 340-1, a filter 350-1 and a memory 360-1.

The decoder 300-0 of layer 0 may include an entropy decoder 310-0, a residual processor 320-0, a predictor 330-0, an adder 340-0, a filter 350-0 and a memory 360-0.

When a bitstream including image information is transmitted from the encoding apparatus, DEMUX 305 may demultiplex the information for each layer and deliver the information to the decoding apparatus for each layer.

The entropy decoder 310-1, 310-0 may perform decoding according to the coding method used in the encoding apparatus. For example, when CABAC is used in the encoding apparatus, the entropy decoder 310-1, 310-0 may also perform entropy decoding based on CABAC.

When the prediction mode for a current block is the intra prediction mode, the predictor 330-1, 330-0 may perform intra prediction on the current block based on neighboring reconstructed samples within the current picture.

When the prediction mode for the current block is an inter prediction mode, the predictor 330-1, 330-0 may perform inter prediction on the current block based on the information included in at least one of a picture before the current picture or a picture after the current picture. The information received from the encoding device may be checked, and part or all of the motion information required for inter prediction may be derived based on the checked information.

When the skip mode is applied as the inter prediction mode, residuals may not be transmitted from the encoding apparatus, and the prediction block may be used as a reconstructed block.

Meanwhile, the predictor 330-1 of layer 1 may perform inter prediction or intra prediction using only the information within layer 1 or may perform inter-layer prediction using the information of another layer (layer 0).

Information of the current layer predicted using the information of a different layer (i.e., predicted by inter-layer prediction) includes at least one of texture, motion information, unit information, and predetermined parameters (e.g., filtering parameters).

Also, information of the different layer used for prediction of the current layer (i.e., used for inter-layer prediction) may include at least one of texture, motion information, unit information, and predetermined parameters (e.g., filtering parameters).

In inter-layer prediction, a current block may be a block within the current picture of a current layer (e.g., layer 1) and may be a target block to be decoded. A reference block may be a block within a picture (reference picture) belonging to the same access unit (AU) as the picture (current picture) to which the current block belongs in a layer (reference layer, for example, layer 0) referenced for prediction of the current block and may be a block corresponding to the current block.

One example of inter-layer prediction is inter-layer motion prediction that predicts motion information of a current layer using motion information of a reference layer. According to inter-layer motion prediction, motion information of a current block may be predicted based on the motion information of a reference block. In other words, in deriving motion information based on the inter prediction mode to be described later, a motion information candidate may be derived using the motion information of an inter-layer reference block instead of a temporal neighboring block.

When inter-layer motion prediction is applied, the predictor 330-1 may scale and use the reference block (i.e., inter-layer reference block) motion information of the reference layer.

In another example of inter-layer prediction, inter-layer texture prediction may use the texture of a reconstructed reference block as a prediction value for the current block. In this case, the predictor 330-1 may scale the texture of the reference block through upsampling. Inter-layer texture prediction may be called inter-layer (reconstructed) sample prediction or simply inter-layer prediction.

In inter-layer parameter prediction, which is yet another example of inter-layer prediction, a parameter derived from the reference layer may be reused in the current layer, or a parameter for the current layer may be derived based on the parameter used in the reference layer.

In inter-layer residual prediction, which is still another example of inter-layer prediction, residuals of the current layer may be predicted using residual information of another layer, and prediction for the current block may be performed based on the predicted residuals.

In inter-layer differential prediction, which is yet still another example of inter-layer prediction, prediction for the current block may be performed using a difference between images obtained by upsampling or downsampling of a reconstructed picture of the current layer and a reconstructed picture of the reference layer.

In inter-layer syntax prediction, which is still yet another example of inter-layer prediction, the texture of a current block may be predicted or generated using syntax information of the reference layer. In this case, the syntax information of the referenced reference layer may include information on the intra prediction mode and motion information.

When predicting a specific block, a plurality of prediction methods using the inter-layer prediction may use multiple layers.

Here, as examples of inter-layer prediction, inter-layer texture prediction, inter-layer motion prediction, inter-layer unit information prediction, inter-layer parameter prediction, inter-layer residual prediction, inter-layer differential prediction, and inter-layer syntax prediction have been described; however, inter-layer prediction applicable to the present disclosure is not limited to the examples above.

For example, inter-layer prediction may be applied as an extension of inter prediction for the current layer. In other words, inter prediction for the current block may be performed by including a reference picture derived from the reference layer in the reference pictures that may be referenced for inter prediction of the current block.

When the reference picture index received from the encoding apparatus or the reference picture index derived from neighboring blocks indicates an inter-layer reference picture within the reference picture list, the predictor 330-1 may perform inter-layer prediction using the inter-layer reference picture. For example, when the reference picture index indicates the inter-layer reference picture, the predictor 330-1 may derive sample values of a region specified by a motion vector in the inter-layer reference picture as a prediction block for the current block.

In this case, the inter-layer reference picture may be included in a reference picture list for the current block. Using the inter-layer reference picture, the predictor 530-1 may perform inter prediction on the current block.

Here, the inter-layer reference picture may be a reference picture constructed by sampling a reconstructed picture of the reference layer to correspond to the current layer. Therefore, when the reconstructed picture of the reference layer corresponds to a picture of the current layer, the reconstructed picture of the reference layer may be used as the inter-layer reference picture without sampling. For example, when the width and height of samples in a reconstructed picture of the reference layer are the same as those of samples in a reconstructed picture of the current layer; and the offsets between the upper left, upper right, lower left, and lower right of a picture of the reference layer and the upper left, upper right, lower left, and lower right of a picture of the current layer are 0, the reconstructed picture of the reference layer may be used as the inter-layer reference picture of the current layer without re-sampling.

Also, the reconstructed picture of the reference layer from which the inter-layer reference picture is derived may be a picture belonging to the same AU as the current picture to be encoded. When inter prediction for the current block is performed by including an inter-layer reference picture in the reference picture list, the positions of the inter-layer reference picture within the reference picture list L0 and L1 may be different from each other. For example, in the case of the reference picture list L0, the inter-layer reference picture may be located after short-term reference pictures before the current picture, and in the case of the reference picture list L1, the inter-layer reference picture may be located at the end of the reference picture list.

Here, the reference picture list L0 is a reference picture list used for inter prediction of a P slice or a reference picture list used as a first reference picture list in inter prediction of a B slice. The reference picture list L1 is a second reference picture list used for inter prediction of a B slice.

Therefore, the reference picture list L0 may be composed in the order of a short-term reference picture(s) before the current picture, an inter-layer reference picture, a short-term reference picture(s) after the current picture, and a long-term reference picture. The reference picture list L1 may be composed in the order of a short-term reference picture(s) after the current picture, a short-term reference picture(s) before the current picture, a long-term reference picture, and an inter-layer reference picture.

At this time, a predictive slice (P slice) is a slice on which intra prediction is performed or inter prediction is performed using up to one motion vector and reference picture index per prediction block. A bi-predictive slice (B slice) is a slice on which intra prediction is performed, or prediction is performed using up to two motion vectors and reference picture indexes per prediction block. In this regard, an intra slice (I slice) is a slice to which only intra prediction is applied.

Also, when inter prediction for the current block is performed based on the reference picture list including an inter-layer reference picture, the reference picture list may include a plurality of inter-layer reference pictures derived from a plurality of layers.

When the reference picture list includes a plurality of inter-layer reference pictures, inter-layer reference pictures may be cross-arranged within the reference picture list L0 and L1. For example, suppose that two inter-layer reference pictures, an inter-layer reference picture $ILRP_i$, and an inter-layer reference picture $ILRP_j$ are included in the reference picture list used for inter prediction of the current block. In this case, in the reference picture list L0, $ILRP_i$ may be located after short-term reference pictures before the current picture, and $ILRP_j$ may be located at the end of the list. Also, in the reference picture list L1, $ILRP_i$ may be located at the end of the list, and $ILRP_j$ may be located after short-term reference pictures after the current picture.

In this case, the reference picture list L0 may be composed in the order of the short-term reference picture(s) before the current picture, the inter-layer reference picture $ILRP_i$, the short-term reference picture(s) after the current picture, the long-term reference picture, and the inter-layer reference picture $ILRP_j$. The reference picture list L1 may be composed in the order of the short-term reference picture(s) after the current picture, the inter-layer reference picture $ILRP_j$, the short-term reference picture(s) before the current picture, the long-term reference picture, and the inter-layer reference picture $ILRP_i$.

Also, one of the two inter-layer reference pictures may be an inter-layer reference picture derived from a scalable layer related to resolution, and the other may be an inter-layer reference picture derived from a layer providing a different view. In this case, for example, suppose $ILRP_i$ is an inter-layer reference picture derived from a layer that provides a different resolution, and $ILRP_j$ is an inter-layer reference picture derived from a layer that provides a different view. Then, in the case of scalable video coding that supports only scalability except for a view, the reference picture list L0 may be composed in the order of the short-term reference picture(s) before the current picture, the inter-layer reference picture $ILRP_i$, the short-term reference picture(s) after the current picture, and the long-term reference picture. On the other hand, the reference picture list L1 may be composed in the order of the short-term reference picture(s) after the current picture, the short-term reference picture(s) before the current picture, the long-term reference picture, and the inter-layer reference picture $ILRP_j$.

Meanwhile, for inter-layer prediction, the information of an inter-layer reference picture may be composed of only a sample value, only motion information (motion vector), or both the sample value and the motion information. When the reference picture index indicates the inter-layer reference picture, the predictor 330-1 uses only the sample value of the inter-layer reference picture, motion information (motion vector) of the inter-layer reference picture, or both of the sample value and the motion information of the inter-layer reference picture according to the information received from the encoding apparatus.

When only the sample values of the inter-layer reference picture are used, the predictor 330-1 may derive samples of a block specified by a motion vector in the inter-layer reference picture as prediction samples of the current block. In the case of scalable video coding that does not consider a view, the motion vector in inter prediction (inter-layer prediction) using the inter-layer reference picture may be set to a fixed value (for example, 0).

When only the motion information of an inter-layer reference picture is used, the predictor 530-1 may use a motion vector specified in the inter-layer reference picture as a motion vector predictor for deriving the motion vector of the current block. Also, the predictor 530-1 may use a motion vector specified in the inter-layer reference picture as the motion vector of the current block.

When both the samples and the motion information of the inter-layer reference picture are used, the predictor 330-1 may use the samples related to the current block in the inter-layer reference picture and the motion information (motion vector) specified in the inter-layer reference picture for prediction of the current block.

The decoding apparatus may receive a reference index indicating an inter-layer reference picture within the reference picture list from the encoding apparatus and perform inter-layer prediction based on the received reference index. Also, the decoding apparatus may receive, from the encoding apparatus, information that specifies which information (sample information, motion information, or sample information and motion information) to use from the inter-layer reference picture, namely, information that specifies dependency type of the dependency related to the inter-layer prediction between two layers.

Meanwhile, the multi-layer based video/image coding may be performed by using image information related to inter-layer prediction, e.g., information related to an inter-layer reference picture (ILRP). The image information may, for example, be signaled from an encoding apparatus to a decoding apparatus via high level syntax (HLS). In the present specification, HLS may include at least one of APS syntax, PPS syntax, SPS syntax. VPS syntax, picture header syntax, and slice header syntax.

Figure 6:
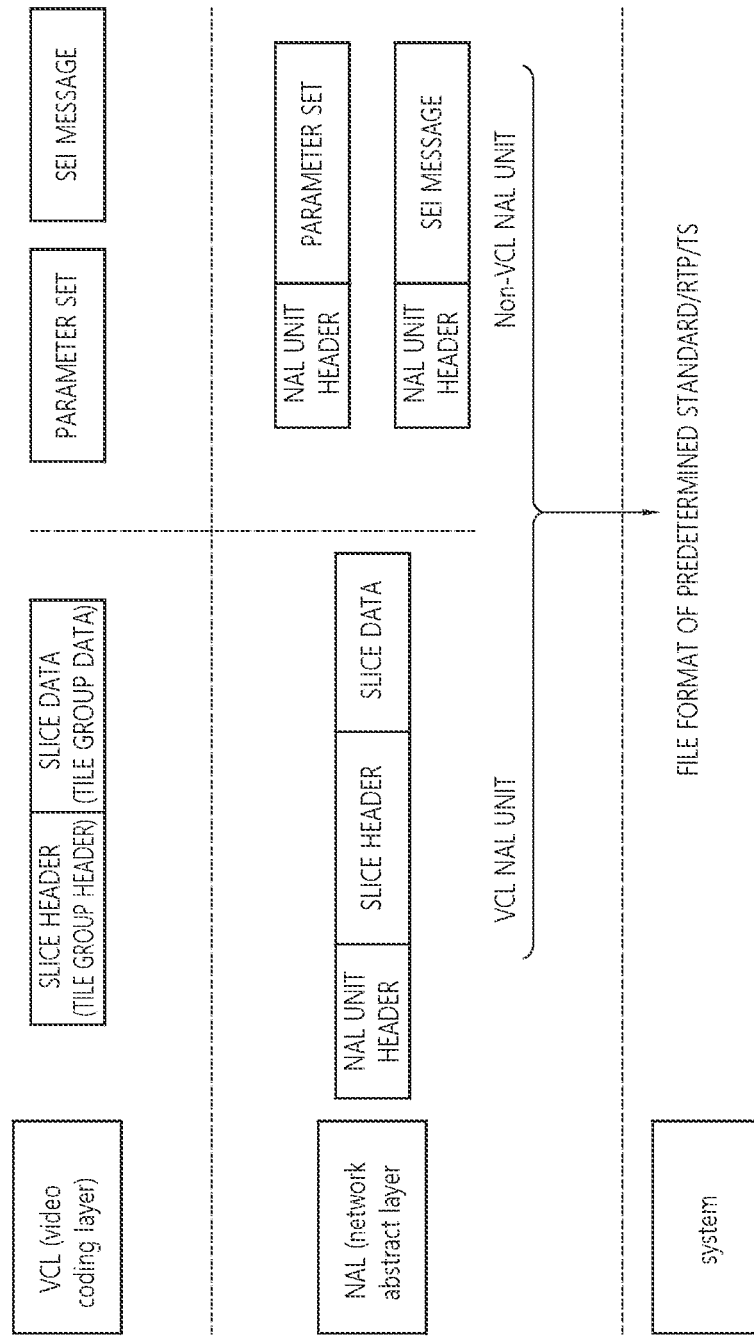
FIG. 6 exemplarily shows a hierarchical structure for a coded video/image.

FIG. 6 exemplarily shows a hierarchical structure for a coded image/video.

Referring to FIG. 6, coded image/video is divided into a video coding layer (VCL) that handles the decoding process of the image/video and itself, a subsystem that transmits and stores the coded information, and NAL (network abstraction layer) in charge of function and present between the VCL and the subsystem.

In the VCL, VCL data including compressed image data (slice data) is generated, or a parameter set including a picture parameter set (PSP), a sequence parameter set (SPS), and a video parameter set (VPS) or a supplemental enhancement information (SET) message additionally required for an image decoding process may be generated.

In the NAL, a NAL unit may be generated by adding header information (NAL unit header) to a raw byte sequence payload (RBSP) generated in a VCL. In this case, the RBSP refers to slice data, parameter set, SEI message, etc., generated in the VCL. The NAL unit header may include NAL unit type information specified according to RBSP data included in the corresponding NAL unit.

As shown in the FIG. 6, the NAL unit may be classified into a VCL NAL unit and a Non-VCL NAL unit according to the RBSP generated in the VCL. The VCL NAL unit may mean a NAL unit that includes information on the image (slice data) on the image, and the Non-VCL NAL unit may mean a NAL unit that includes information (parameter set or SEI message) required for decoding the image.

The above-described VCL NAL unit and Non-VCL NAL unit may be transmitted through a network by attaching header information according to the data standard of the subsystem. For example, the NAL unit may be transformed into a data format of a predetermined standard such as an H.266/VVC file format, a real-time transport protocol (RTP), a transport stream (TS), etc., and transmitted through various networks.

As described above, the NAL unit may be specified with the NAL unit type according to the RBSP data structure included in the corresponding NAL unit, and information on the NAL unit type may be stored and signaled in the NAL unit header.

For example, the NAL unit may be classified into a VCL NAL unit type and a Non-VCL NAL unit type according to whether the NAL unit includes information (slice data) about an image. The VCL NAL unit type may be classified according to the nature and type of pictures included in the VCL NAL unit, and the Non-VCL NAL unit type may be classified according to types of parameter sets.

The following is an example of the NAL unit type specified according to the type of parameter set included in the Non-VCL NAL unit type.

APS (Adaptation Parameter Set) NAL unit: Type for NAL unit including APS

DPS (Decoding Parameter Set) NAL unit: Type for NAL unit including DPS

VPS (Video Parameter Set) NAL unit: Type for NAL unit including VPS

SPS (Sequence Parameter Set) NAL unit: Type for NAL unit including SPS

PPS (Picture Parameter Set) NAL unit: Type for NAL unit including PPS

PH (Picture header) NAL unit: Type for NAL unit including PH

The aforementioned NAL unit types may have syntax information for the NAL unit type, and the syntax information may be stored and signaled in a NAL unit header. For example, the syntax information may be nal_unit_type, and NAL unit types may be specified by a nal_unit_type value.

Meanwhile, as described above, one picture may include a plurality of slices, and one slice may include a slice header and slice data. In this case, one picture header may be further added to a plurality of slices (a slice header and a slice data set) in one picture. The picture header (picture header syntax) may include information/parameters commonly applicable to the picture. For example, one picture may be configured of different types of slices, such as an intra-coded slice (i.e., I-slice) and/or inter-coded slice (i.e., P-slice and B-slice). In this case, a picture header may include information/parameters being applied to an intra-coded slice and an inter-coded slice. Alternatively, one picture may also be configured of one type of slices.

The slice header (slice header syntax) may include information/parameters commonly applicable to the slice. The APS (APS syntax) or PPS (PPS syntax) may include information/parameters commonly applicable to one or more slices or pictures. The SPS (SPS syntax) may include information/parameters commonly applicable to one or more sequences. The VPS (VPS syntax) may include information/parameters commonly applicable to multiple layers. The DPS (DPS syntax) may include information/parameters commonly applicable to the entire video. The DPS may include information/parameters related to concatenation of a coded video sequence (CVS).

In the present specification (or document), the video/image information that is encoded and signaled in the form of a bitstream from the encoding apparatus to the decoding apparatus may not only include information related to intra-picture partitioning, intra/inter prediction information, information related to inter-layer prediction, residual information, in-loop filtering information, and so on, but may also include information included in the slice header, information included in the picture header, information included in the APS, information included in the PPS, information included in the SPS, information included in the VPS, and/or information included in the DPS. Additionally, the video/image information may further include information of the NAL unit header.

Meanwhile, the encoding apparatus may generate a reference picture list in order to generate a prediction sample. Image information including information related to a reference picture list may be signaled to the decoding apparatus through a bitstream. According to the current VVC standard, the information related to the reference picture list may be signaled as described below.

The information related to the reference picture list may, for example, be signaled through a syntax structure as shown below in Table 1.

TABLE 1

| | Descriptor |
|---|---|
| ref_pic_lists( ) { | |
|   for( i = 0; i < 2; i+++ ) { | |
|     if( sps_num_ref_pic_lists[ i ] > 0 && | |
|       ( i = = 0 \|\| ( i = = 1 && pps_rpl1_idx_present_flag) ) ) | |
|       rpl_sps_flag[ i ] | u(1) |
|     if( rpl_sps_flag[ i ]) { | |
|       if( sps_num_ref_pic_lists[ i ] > 1 && | |
|         (i = = 0 \|\| ( = = 1 && pps_rpl1_idx_present_flag ) ) ) | |
|       rpl_idx[ i ] | u(v) |
|     } else | |
|       ref_pic_list_struct( i, sps_num_ref_pic_lists[ i ] ) | |
|     for( j = 0; j < NumLtrpEntries[ i ][ RplsIdx[ i ] ]; j++ ) { | |
|       if(ltrp_in_header_flag[ i ][ RplsIdx[ i ] ] ) | |
|         poc_lsb_lt[ i ][ j ] | u(v) |
|       delta_poc_msb_cycle_present_flag[ i ][ j ] | u(1) |
|       if( delta_poc_msb_cycle_present_flag[ i ][ j ] ) | |
|         delta_poc_msb_cycle_lt[ i ][ j ] | ue(v) |
|     } | |
|   } | |
| } | |

The syntax structure of Table 1 for signaling the information related to the reference picture list may exist within a picture header (PH) or a slice header (SH).

Semantics of syntax elements included in the syntax structure of Table 1 may, for example, be described as shown below in Table 2.

TABLE 2 rpl_sps_flag[ i ] equal to 1 specifies that reference picture list i in ref pic lists( ) is derived based o
n one of the ref pic list struct( listIdx, rpisidx ) syntax structures with listIdx equal to i in the SPS. rp
1_sps_flag[ i ] equal to 0 specifies that reference picture list i of the picture is derived based on the
ref pic list struct( listIdx, rplsIdx ) syntax structure with listIdx equal to i that is directly included in
ref pic lists( ).
When rpl_sps_flag[ i ] is not present, it is inferred as follows:
- If sps num ref pic lists[ i ] is equal to 0, the value of rpl sps flag[ i ] is inferred to be equal to 0.
- Otherwise (sps num ref pic lists[ i ] is greater than 0), when pps_rpl1_idx_present_flag is equal to 0 and
  i is equal to 1, the value of rpl sps flag[ 1 ] is inferred to be equal to rpl sps flag[ 0 ].
rpl_idx[ i ] specifies the index, into the list of the ref_pic_list_struct( listIdx, rplsIdx ) syntax structure
s with listIdx equal to i included in the SPS, of the ref pic list struct( listIdx, rplsIdx ) syntax structu
re with listIdx equal to i that is used for derivation of reference picture list i of the current picture.
    The syntax element rpl idx[ i] is represented by Cell( Log2( sps num ref pic lists[ i ] ) ) bits. The val
ue of rpl_idx[ i ] shall be in the range of 0 to sps_num_ref_pic_lists[ i ] − 1, inclusive. When not pre
sent, if rpl_sps_flag[ i ] is equal to 1 and pps_rpl1_idx_present_flag is equal to 0, the value of rpl_i
dx[ 1 ] is inferred to be equal to rpl_idx[ 0 ], otherwise the value of rpl_idx[ 1 ] is inferred to be eq
ual to 0.
The variable RplsIdx[ i ] is derived as follows:
        RplsIdx[ i ] = rpl_sps_flag[ i ] ? rpl idx[ i ] : sps num ref pic lists[ i ]
poc_lsb_lt[ i ][ j ] specifies the value of the picture order count modulo MaxPicOrderCntLab of the j-t
h LTRP entry in the i-th reference picture list in the ref pic lists( ) syntax structure. The length of t
he poc_lsb_lt[ i ][ j ] syntax element is sps_log2_max_pic_order_cnt_lsb_minus4 + 4 bits.
The variable PocLsbLt[ i ][ j ] is derived as follows:
        PocLsbLt[ i ][ j ] = ltrp_in_header_flag[ i ][ RplsIdx[ i ] ] ?
           poc_lsb lt[ i ][ j ] : rpls poc lsb lt[ listIIdx ][ RplsIdx[ i ] ][ j ]
delta_poc_msb_cycle_present_flag[ i ][ j ] equal to 1 specifies that delta_poc_msb_cycle_lt[ i ][ j ] is p
resent. delta poc msb cycle present flag[ i ][ j ] equal to 0 specifies that delta poc msb cycle lt[ i ]
[ j ] is not present.
Let prevTidoPic be the previous picture in decoding order that has nuh layer id the same as the sli
ce or picture header referring to the ref pic lists( ) syntax structure, has TemporalId equal to 0, and
is not a RASL or RADL picture. Let setOfPrevPocVals be a set consisting of the following:
- the PicOrderCntVal of prevTid0Pic,
- the PicOrderCntVal of each picture that is referred to by entries in RefPicList[ 0 ] or RefPicList
  [ 1 ] of prevTid0Pic and has nuh layer id the same as the current picture,
- the PicOrderCntVal of each picture that follows prevTid0Pic in decoding order, has nuh_layer_id
  the same as the current picture, and precedes the current picture in decoding order.
When there is more than one value in setOfPrevPocVals for which the value modulo MaxPicOrderC
ntLsb is equal to PocLsbLt[ i ][ j ], the value of delta poc msb cycle present flag[ i ][ j ] shall be equ
al to 1.
delta_poc_msb_cycle_lt[ i ][ j ] specifies the value of the variable FullPocLt[ i ][ j ] as follows:
        if( j   = =    0 )
            deltaPocMsbCycleLt[ i ][ j ] = delta poc msb cycle lt[ i ][ j ]
        else
            deltaPocMsbCycleLt[ i ][ j ] = delta poc msb cycle lt[ i ][ j ] + deltaPocMsbCycleLt[ i ]
[ j − 1 ]
        FullPocLt[ i ][ j ] = PicOrderCntVal − deltaPocMsbCycleLt[ i ][ j ] * MaxPicOrderCntLsb −
            ( PicOrderCntVal & ( MaxPicOrderCntLsb − 1 ) ) + PocLsbLt[ i ][ j ]

TABLE 2-continued

The value of delta_poc_msb_cycle_lt[ i ][ j ] shall be in the range of 0 to $2^{(32 - sps\_log2\_max\_pic\_order\_cnt\_lsb\_minus4 - 4)}$, inclusive. When not present, the value of delta poc msb cycle lt[ i ][ j ] is inferred to be equal to 0.

The information related to the reference picture list may include a reference picture list structure field. The reference picture list structure field may correspond to the ref_pic_list_struct of Table 1.

The reference picture list structure field may, for example, be signaled through a syntax structure as shown below in Table 3.

TABLE 3

| | Descriptor |
|---|---|
| ref_pic_list_struct( listIdx, rplsIdx ) { | |
|   num_ref_entries[ listIdx ][ rplsIdx ] | ue(v) |
|   if( sps_long_term_ref_pics_flag && rplsIdx < sps_num_ref_pic_lists[ listIdx ] ) | |
|     ltrp_in_header_flag[ listIdx ][ rplsIdx ] | u( 1 ) |
|   for( i = 0, j = 0; i < nom ref entries[ listIdx ][ rplsIdx ]; i++) { | |
|     if( sps_inter_layer_ref_pics_present_flag ) | |
|       inter_layer_ref_pic_flag[ listIdx ][ rplsIdx ][ i ] | u(1) |
|     if( !inter_layer_ref_pic_flag[ listIdx ][ rplsIdx ][ i ] ) { | |
|       if( sps_long_term_ref_pics_flag ) | |
|         st_ref_pic_flag[ listIdx ][ rplsIdx ][ i ] | u(1) |
|       if( st_ref_pic_flag[ listIdx ][ rplsIdx ] ) { | |
|         abs_delta_poc_st[ listIdx ][ rplsIdx ][ i ] | ue(v) |
|         if( AbsDeltaPocSt[ listIdx ][ rplsIdx ][ i ] > 0 ) | |
|           strp_entry_sign_flag[ listIdx ][ rplsIdx ][ i ] | u(1) |
|       } else if( !ltrp_in_header_flag[ listIdx ][ rplsIdx ] ) | |
|         rpls_poc_lsb_lt[ listIdx ][ rplsIdx ][ j++ ] | u(v) |
|     } else | |
|       ilrp_idx[ listIdx ][ rplsIdx ][ i ] | ue(v) |
|   } | |
| } | |

The reference picture list structure field may exist within a sequence parameter set. (SPS), PH or SH. For each of a case where the reference picture list structure field exists within the PH or SH and a case where the reference picture list structure field exists within an SPS, the reference picture list structure field may, for example, indicate the following description as shown below in Table 4.

TABLE 4

The ref pic list struct( listIdx, rplaidx ) syntax structure may be present in an SPS, in a PH syntax structure, or in a slice header. Depending on whether the syntax structure is included in an SPS, a PH syntax structure, or a slice header, the following applies:
- If present in a PH syntax structure or slice header, the ref_pic_list_struct( listIdx, rplsIdx ) syntax structure specifies reference picture list listIdx of the current picture (i.e., the coded picture containing the PH syntax structure or slice header).
- Otherwise (present in an SPS), the ref pic_list_struct( listIdx, rplsIdx ) syntax structure specifies a candidate for reference picture list listIdx, and the term "the current picture" in the semantics specified in the remainder of this clause refers to each picture that 1) has a PH syntax structure or one or more slices containing rpl idx[ listIdx ] equal to an index into the list of the ref_pic_list_struct( listIdx, rplsIdx ) syntax structures included in the SPS, and 2) is in a CLVS that refers to the SPS.

Semantics of syntax elements included in the syntax structure of Table 3 may, for example, be described as shown below in Table 5.

TABLE 5 num_ref_entries[ listIdx ][ rplsIdx ] specifies the number of entries in the ref pic list struct( listIdx, rplsIdx ) syntax structure. The value of num_ref_entries[ listIdx ][ rplsIdx ] shall be in the range of 0 to MaxDpbSize + 13, inclusive, where MaxDpbSize is as specified in clause A.4.2.
ltrp_in_header_flag[ listIdx ][ rplsIdx ] equal to 0 specifies that the POC LSBs of the LTRP entries indicated in the ref_pic_list_struct( listIdx, rplsIdx ) syntax structure are present in the same syntax structure. ltrp_in_header_flag[ listIdx ][ rplsIdx ] equal to 1 specifies that the POC LSBs of the LTRP entries indicated in the ref_pic_list_struct( listIdx, rplsIdx ) syntax structure are not present in the same syntax structure. When sps_long_term_ref_pics_flag is equal to 1 and rplsIdx is equal to sps_num_r TABLE 5-continued ef_pic_lists[ listIdx ], the vlaue of ltrp_in_header_flag[ listIdx ][ rplsIdx ] is inferred to be equal to 1.
inter_layer_ref_pic_flag[ listIdx ][ xplsIdx ][ i ] equal to 1 specifies that the i-th entry in the
ref_pic_list_struct( listIdx, rplsIdx ) syntax structure is an ILRP entry, inter_layer_ref_pic_flag[ listIdx ]
[ rplsIdx ][ i ] equal to 0 specifies that the i-th entry in the ref_pic_list_struct( listIdx, rplsIdx ) syntax
structure is not an ILRP entry. When not present, the value of inter_layer_ref_pic_flag[ listIdx ][ rplsI
dx ][ i ] is inferred to be equal to 0.
st_ref_pic_flag[ listIdx ][ rplsIdx ][ i ] equal to 1 specifies that the i-th entry in the
ref_pic_list_struct( listIdx, rplsIdx ) syntax structure is an STRP entry. st_ref_pic_flag[ listIdx ][ rplsIdx]
[ i ] equal to 0 specifies that the i-th entry in the ref_pic_list_struct( listIdx, rplsIdx ) syntax structure
is an LTRP entry. When inter_layer_ref_pic_flag[ listIdx ][ rplsIdx ][ i ] is equal to 0 and st_ref_pic_fl
ag[ listIdx ][ rplsIdx ][ i ] is not present, the value of st_ref_pic_flag[ listIdx ][ rplaIdx ][ i ] is inferred t
o be equal to 1.
The variable NumLtrpEntries[ listIdx ][ rplsIdx ] is derived as follows:
    for( i = 0, NumLtrpEntries[ listIdx ][ rplsIdx ] = 0; i < num_ref_entries[ listIdx ][ rplsIdx ]; i+
+ )
      if( !inter_layer_ref_pic_flag[ listIdx ][ rplsIdx ][ i ] && !st_ref_pic_flag[ listIdx ][ rplsIdx ]
[ i ] )
        NumLtrpEntries[ listIdx ][ rplsIdx ]++
abs_delta_poc_st[ listIdx ][ rplsIdx ][ i ] specifies the value of the variable AbsDeltaPocSt[ listIdx ][ rpl
sIdx ][ i ] as follows:
    if( ( sps_weighted_pred_flag  | |  sps_weighted_bipred_flag  )  &&  i != 0 )
      AbsDeltaPocSt[ listIdx ][ rplsIdx ][ i ] = abs_delta_poc_st[ listIdx ][ rplsIdx ][ i ]
    else
      AbsDeltaPocSt[ listIdx ][ rplaIdx ][ i ] = abs delta poc st[ listIdx }[ rplsIdx ][ i ] + 1
The value of abs_delta_poc_st[ listIdx ][ rplsidx ][ i ] shall be in the range of 0 to $2^{15} - 1$, inclusive.
strp_entry_sign_flag[ listIdx ][ rplsIdx ][ 1] equal to 1 specifies that i-th entry in the syntax structure
ref_pic_list_struct( listIdx, rplsIdx ) has a value greater than or equal to 0. strp_entry_sign_flag[ listId
x ][ rplsIdx ][ i ] equal to 0 specifies that the i-th entry in the syntax structure ref_pic_list_struct( listI
dx, rplsIdx ) has a value less than 0. When not present, the value of strp_entry_sign_flag[ listIdx ][ rp
lsIdx ][ i ] is inferred to be equal to 1.
The list DeltaPocValSt[ listIdx ][ rplsIdx ] is derived as follows:
    for( i = 0; 1 < num_ref_entries[ listIdx ][ rplsIdx ]; i++ )
      if( !inter layer_ref pic flag[ listIdx ][ rplsIdx ][ i ] && st_ref pic flag[ listIdx ][ rplsIdx ][ i ]
)
        DeltaPocValSt[ listIdx ][ rplsIdx ][ i ] = ( strp_entry_sign_flag[ listIdx ][ rplsIdx ][ i ] ) ?
          AbsDeltaPocSt[ listIdx ][ rplsIdx ][ i ] : 0 − AbsDeltaPocSt[ listIdx ][ rplsIdx ][ i ]
rpls_poc_lsb_lt[ listIdx ][ rplsIdx ][ i ] specifies the value of the picture order count modulo MaxPicOr
derCntLsb of the picture referred to by the i-th entry in the ref_pic_list_struct( listIdx, rplsIdx ) synta
x structure. The length of the rpls_poc_lsb_lt[ listIdx ][ rplsIdx ][ i ] syntax element is sps_log2_max_p
ic_order_cnt_lsb_minus4 + 4 bits.
ilrp_idx[ listIdx ][ rplsIdx ][ i ] specifies the index, to the list of the direct reference layers, of the IL
RP of the i-th entry in the ref_pic_list_struct( listIdx, rplsIdx ) syntax structure. The value of ilrp_idx
[ listIdx ][ rplsIdx ][ i ] shall be in the range of 0 to NumDirectRefLayers[ GeneralLayerIdx[ nuh_layer_
id ] ] − 1, inclusive.

In Table 5, ilrp_idx may be a syntax element indicating an inter-layer reference picture (ILRP) index. Most particularly, as an index within a list of the direct reference layers (or direct reference layer list), the ILRP index may be an index for indicating a layer of an ILRP within a list of the direct reference layers. Herein, the list of the direct reference layers may be a list including a layer of the ILRP that is directly referred to by a standard slice for performing inter-layer prediction. As an example, the standard slice may include a current slice.

Meanwhile, information signaled through the syntax structures of Table 1 and Table 3 may be used in a reference picture list generation (or construction) process. The reference picture list generation (or construction) process may, for example, be described as shown below in Table 6.

TABLE 6

The information signalled in the above syntax tables are used for the reference picture list construction process
as described below.
This process is invoked at the beginning of the decoding process for each slice of a picture.
Reference pictures are addressed through reference indices. A reference index is an index into a refe
rence picture list. When decoding an I slice, no reference picture list is used in decoding of the slic
e data. When decoding a P alice, only reference picture list 0 (i.e., RefPicList[ 0 ]), is used in decod
ing of the slice data. When decoding a B slice, both reference picture list 0 and reference picture li
st 1 (i.e., RefPicList[ 1 ]) are used in decoding of the slice data.
At the beginning of the decoding process for each slice of a picture, the reference picture lists RefP
icList[ 0 ] and RefPicList[ 1 ] are derived. The reference picture lists are used in marking of referenc
e pictures or in decoding of the slice data.
    NOTE 1 - For an I slice of a picture, RefPicList[ 0] and RefPicList[ 1 ] may be derived for bitstream confor
    mance checking purpose, but their derivation is not necessary for decoding of the current picture of pictures
      following the current pictura in decoding order. For a P slice of a picture, RetPicList[ 1 ] may be derived
    for bitstream conformance checking purpose, but its derivation is not necessary for decoding of the current
    picture or pictures following the current picture in decoding order.

TABLE 6-continued

If sps_idr_rol present flag is equal to 0 and nal unit type is equal to IDR_W_RADL or IDR_N_LP,
the reference picture lists RefPicList[ 0 ] and RefPicList[ 1 ] are both derived to be empty, i.e., to contain 0 entries, and the following applies for each i equal to 0 or 1:
- The value of RplsIdx[ i ] is inferred to be equal to sps num ref pic_lists[ i ].
- The value of num_ref_entries[ i ][ RplsIdx[ i ] ] is inferred to be equal to 0.
- The value of NumRefIdxActive[ i ] is inferred to be equal to 0.

Otherwise, the reference picture lists RefPicList[ 0 ] and RefPicList[ 1 ], the reference picture scaling ratios RefPicScale[ i ][ j ][ 0 ] and RefPicScale[ i ][ j ][ 1 ], and the reference picture scaled flags RprConstraintsActive[ 0 ][ j ] and RprConstraintsActive[ 1 ][ j ] are derived as follows:

```
for( i = 0; i < 2; i++ ) {
    for( j = 0, k = 0, pocBase = PicOrderCntVal; j < num_ref entries[ i ][ RplsIdx[ i ] ]; j++) {
        if(  !inter_layer_ref_pic_flag[ i ][ RplsIdx[ i ] ][ j ]  ) {
            If(  st_ref_pic_flag[ i ][ RplsIdx[ 1 ] ][ j ]  ) {
                RefPicPocList[ i ][ j ] ] = pocBase – DeltaPocValSt[ 1 ][ RplsIdx[ i ] ][ j ]
                if( there is a reference picture picA in the DPB with the same nuh_layer_id as the current picture
                    and PicOrderCntVal equal to RefPicPocList[ 1 ][ j ] )
                    RefPicList[ i ][ j ] ] = picA
                else
                    RefPicList[ i ][ ] ] = "no reference picture"
                pocBase = RefPicPocList[ i ][ j ] ]
            } else {
                if(  !delta_poc_msb_cycle_present_flag[ i ][ k ]  ) {
                    if(  there is a reference picA in the DPB with the same nuh layer id as the current picture and
                        PicOrderCntVal & ( MaxPicOrderCutLsb – 1 ) equal to PocLsbLt[ 1 ] [ k ]  )
                        RefPicList[ i ][ j ] ] = picA
                    else
                        RefPicList[ i ][ j ] ] = "no reference picture"
                    RefPicLtPocList[ i ][ j ] = PocLsbLt[ i ][ k ]
                } else {
                    if( there is a reference picA in the DPB with the same nuh_layer_id as the current picture and
                        PicOrderCntVal equal to                        FullPocLi[ i ][ k ]  )
                        RefPicList[ i ][ j ] = picA
                    else
                        RefPicList[ i ][ j ] = "no reference picture"
                    RefPicLiPocList[ i ][ j ] = FullPocLt[ i ][ k ]
                }
                k++
            }
        } else }
            layerIdx = DirectRefLayerIdx[ GeneralLayerIdx[ nuh_layer_id ] ][ ilrp_idx[ i ][ RplsIdx ][ j ] ]
            refPicLayerId = vps_layer_id[ layerIdx ]
            if( there is a reference picture picA in the DPB with nuh_layer_id equal to refPicLayerId and
                the same PicOrderCntVal as the current picture  )
                RefPicList[ i ][ j ] ] = picA
            else
                RefPicList[ i ][ j ] = "no reference picture"
        }
        fRefWidth is set equal to CurrPicScalWinWidthL of the reference picture RetPicList[ i ][ j ]
        fRefHeight is set equal to CurrPicScalWinHeightL of the reference picture RefPicList[ i ][ j ]
        refPicWidth, refPicHeight, refScalingWinLeftOffset, refScalingWinRightOffset, refScalingWinTopOffset,
            and refScalingWinBottomOffset, are set equal to the values of pps_pie_width in luma_samples,
            pps_pic_height_in_luma_samples, pps_scaling_win_left_offset, pps_scaling_win_right_offset,
            pps_scaling_win_top_offset, and pps_scaling_win_bottom_offset, respectively, of the reference picture
            RefPicList[ i ][ j ]
        RefPicScale[ i ][ j ][ 0 ] = ((fRefWidth << 14 ) + ( CurPicSealWinWidthL > 1))/
            CurrPicScalWin WidthL
        RefPicScale[ i ][ j ][ 1 ] = ((fRetHeight << 14)+(CunPicScalWinHeightL >> 1))/
            CurPicScalWinHeightL
        RprConstraintsActive[ i ][ j ] = ( pps_pic_width_in_luma_samples  !=  refPicWidth  ||
            pps_pic_height_in_luma_samples  !=  refPicHeight  ||
            pps_scaling_win_left_offset  !=  refScalingWinLeftOffset  ||
            pps_scaling_win_right_offset  !=  refScalingWinRightOffset  ||
            pps_scaling_win_top_offset  !=  refScaling Win TopOffset  ||
            pps_scaling_win_bottom_offset  !=  refScaling WinBottomOffset )
    }
}
```

TABLE 6-continued

For each i equal to 0 or 1, the first NumRefIdxActive[ i ] entries in RefPicList[ i ] are referred to as the active entries in RefPicList[ i], and the other entries in RefPicList[ i] are referred to as the inactive entries in RefPicList[ i ].

NOTE 2 - It is possible that a particular picture is referred to by both an entry in RefPicList[ 0 ] and an entry in RefPicList[ 1 ]. It is also possible that a particular picture is referred to by more than one entry in RefPicList[ 0] or by more than one entry in RefPicList[ 1 ].

NOTE 3 - The active entries in RefPicList[ 0 ] and the active entries in RefPicList[ 1 ] collectively refer to al l reference pictures that may be used for inter prediction of the current picture and one or more pictures that follow the current picture in decoding order. The inactive entries in RefPicList[ 0] and the inactive entries in RefPicList[ 1 ] collectively refer to all reference pictures that are not used for inter prediction of the current picture but may be used in inter prediction for one or more pictures that follow the current picture in decoding order.

NOTE 4 - There may be one or more entries in RetPicList[ 0] or RetPicList[ 1] that are equal to "no reference picture" because the corresponding pictures are not present in the DPB. Each inactive entry in RefPicList[ 0] or RefPicList[ 1 ] that is equal to "no reference picture" should be ignored. An unintentional picture l oss should be inferred for each active entry in RefPicList[ 0 ] or RefPicList[ 1 ] that is equal to "no referenc e picture"

Meanwhile, according to the current VVC standard, a signaling method for identifying a layer index of an inter-layer reference picture (ILRP) is a method of directly signaling a value of a layer index. The signaling method may be different from a signaling method of a short-term reference picture (STRP), which uses a delta value instead of a picture order count (POC) value. Adjusting the layer index signaling method of the ILRP to be similar to the signaling method of the STRP may at least have the following advantages.

1. The number of bits that are needed for signaling in a general usage case of inter-layer prediction, which mainly refers to one layer below the current layer, i.e., a close-ranged layer, may be reduced. Accordingly, the delta value may actually be small.

2. The above-mentioned method is SPS-sharing friendly. In the current signaling method, since two different dependent layers having spatial extensibility may each have a different reference layer, SPS sharing is impossible. For example, a bitstream having three layers each having spatial extensibility may be assumed. Herein, layer 0 is an independent layer, layer 1 is a layer that is dependent to layer 0, and layer 2 may be dependent to layer 1. In the current signaling method, since SPS for layer 1 includes an ILRP having layer index 0, whereas SPS for layer 2 should include an ILRP having layer index 1, the SPS for layer 1 cannot be shared with layer 2. When signaling an ILRP, if a delta layer index is used, the SPS for layer 1 may be shared with layer 2.

The present specification proposes a method for effectively signaling information related to inter-layer prediction. Most particularly, for layer index signaling of ILRP, the present specification proposes a method for signaling delta ILRP index information.

The embodiments of the present specification may include one or more of the following characteristics. The characteristics that will hereinafter be described may be used independently or in combination.

In order to signal a layer index of an inter-layer reference picture (ILRP), a delta value may be signaled instead of directly signaling a layer index value. For example, the current syntax element ilrp_idx[listIdx][rplsIdx][i] may be replaced with delta_ilrp_idx_minus1[listIdx][rplsIdx][i]. In other words, instead of signaling the syntax element ilrp_idx [listIdx][rplsIdx][i] of Table 3, which is presented above, delta_ilrp_idx_minus1[listIdx][rplsIdx][i] may besignaled, ilrp_idx[listIdx][rplsIdx][i] may be a syntax element that is directly related to a layer index value, and delta_ilrp_idx_minus1[listIdx][rplsIdx][i] may be a syntax element indicating a delta value.

The delta value may be a difference value between layer indexes (or indices) of a slice (or picture) including a reference picture list structure (RPL structure). Most particularly, the delta value may be a difference between a layer index of the current slice and a layer index of an inter-layer reference picture (ILRP).

3. A layer index of the inter-layer reference picture (ILRP) for the current slice may be derived by using a difference value between a layer index of the current slice and the delta value.

Hereinafter, a method for signaling information related to a multi-layer based reference picture list will be described in detail with reference to Table 7 to Table 9.

Information related to a reference picture list according to an embodiment may be signaled through the syntax structure of Table 7, as shown below. A reference picture list may be generated (or constructed) through the syntax structure of Table 7, as shown below.

TABLE 7

| | Descriptor |
|---|---|
| ref_pic_list_struct( listIdx, rplsIdx ) { | |
|   num_ref_entries[ listIdx ][ rplsIdx ] | ue(v) |
|   if( sps_long_term_ref_pics_flag &&& rplsIdx < sps_num_ref_pic_lists[ listIdx ] ) | |
|     ltrp_in_header_flag[ listIdx ][ rplsIdx ] | u(1) |
|   for( 1 = 0, j = 0; i < num_ref_entries[ listIdx ][ rplsIdx ]; i++) | |
|     if( sps_inter_layer_ref_pics_present_flag ) | |

TABLE 7-continued

|  | Descriptor |
|---|---|
|     inter_layer_ref_pic_flag[ listIdx ][ rplsIdx ][ i ] | u(1) |
|     if( !inter_layer_ref_pic_flag[ listIdx ][ rplsIdx ][ i ] ) { |  |
|       if( sps_long_term_ref_pics_flag ) |  |
|         st_ref_pic_flag[ listIdx ][ rplsIdx ][ { ] | u(1) |
|       if( st_ref_pic_flag[ listIdx ][ rplsIdx ][ i ] ) { |  |
|         abs_delta_poe_st[ listIdx ][ rplsIdx ][ i ] | ue(v) |
|         if( AbsDeltaPocSt[ listIdx ][ rplsIdx ][ i ] > 0 ) |  |
|           strp_entry_sign_flag[ listIdx ][ rplsIdx ][ i ] | u(1) |
|       } else if( !ltrp_in_header_flag[ listIdx ][ rplsIdx ] ) |  |
|         rpls_poc_lsb_lt[ listIdx ][ rplsIdx ][ j++ ] | u(v) |
|     } else |  |
|       delta_ilrp_idx_minus1[ listIdx ][ rplsIdx ][ i ] | ue(v) |
|   } |  |
| } |  |

Semantics of syntax elements included in the syntax structure of Table 7 may, for example, be described as shown below in Table 8. The description for the semantics of the syntax element, which has already been described above with reference to Table 4, will be omitted.

TABLE 8 delta_ilrp_idx_minus1[ listIdx ][ rplsIdx ][ i ] plus 1 specifies the delta of index that is used to derive the layer index of the ILRP of the i-th entry in the ref_pic_list_struct( listIdx, rplsIdx ) syntax structure. The value of delta_ilrp_idx_minusi[ listIdx | rplsIdx ][ i ] shall be in the range of 0 to vps_max_layers_minus1, inclusive.

According to an embodiment that is proposed in the present specification, information related to a reference picture list may include information related to an inter-layer reference picture (ILRP). The information related to an ILRP may be information that is needed for performing inter-layer prediction.

The information related to the ILRP may include delta ILRP index information. For example, delta ILRP index information may be information for deriving a layer index of an ILRP.

For example, the delta ILRP index information may be represented in the form of syntax element delta_ilrp_idx_minus1[listIdx][rplsIdx][i]. For example, the syntax element delta_ilrp_idx_minus1[listIdx][rplsIdx][i] may be information for deriving a layer index of an inter-layer reference picture (ILRP).

Meanwhile, according to an embodiment, the information related to the reference picture list may include a reference picture structure field. The reference picture structure field may, for example, correspond to ref_pic_list_struct of Table 6. The reference picture list structure field may include the delta ILRP index information. The reference picture list structure field may be included in an SPS, PH, and/or SH and may then be signaled. The SPS including the reference picture list structure field may be shared by layers each having a different layer index. In other words, different dependent layers may share the SPS.

The reference picture list generation (or construction) process according to an embodiment proposed in the present specification may be represented as shown below in Table 9. Details overlapping with Table 6 will be omitted.

TABLE 9

The RPL construction process is updated as follows:
The reference picture lists RefPicList[ 0 ] and RefPicList[ 1 ], the reference picture scaling ratios Ref
PicScale[ i ][ j ][ 0 ] and RefPicScale[ i ][ j ][ 1 ], and the reference picture scaled flags RprConstraints
Active[ 0 ][ j ] and RprConstraintsActive[ 1 ][ j ] are derived as follows:
    for( i = 0; i < 2: 1++ ) {
      for( j = 0, k = 0, pocBase = PicOrderCntVal; j < num_ref_entries[ i ][ RplsIdx[ i ] ]; j++) {
        if( !inter layer_ref_pic_flag[ i ][ RplsIdx[ i ] ][ j ] ) {
          ...
      } else {
        ilrpidx = GeneralLayeridx[ nuh_layer_id ] − ( delta_ilrp_idx_minus1[ i ][ RplsIdx ][ j ] + 1)
        layerIdx = DirectRefLayerIdx[ GeneralLayerIdx[ nuh_layer_id ] ][ ilrpIdx ]
        refPicLayerId = vps_layer_id[ layerIdx ]

TABLE 9-continued

```
        if( there is a reference picture picA in the DPB with nuh_layer_id equal to refPicLa
yerId and
            the same PicOrderCntVal as the current picture
            RefPicList[ i ][ j ] = picA
        else
            RefPicList[ i ][ j ] = "no reference picture"
    }
    ...
  }
}
```

According to an embodiment, the delta ILRP index information may be related to a delta value between an ILRP index of the ILRP and a standard value. More specifically, a value of the delta ILRP index information plus 1 (delta ILRP index information+1) may be equal to the delta value between the ILRP index and the standard value. As an example, the standard value may include a layer index of a standard layer.

As an index within a direct reference layer list, an ILRP index may be an index for indicating a layer of an ILRP within the direct reference layer list. Herein, the direct reference layer list may be a list including a layer of an ILRP that is directly referred to by a standard slice for performing inter-layer prediction. The standard layer may be a layer including a standard slice. The standard slice may include a current slice.

According to an embodiment, an ILRP index may be derived based on delta ILRP index information and a standard value. As an example, as described above, a standard value may be a layer index of a standard layer. The standard value may, for example, correspond to GeneralLayerIdx [nuh_layer_id]. The delta ILRP index information may, for example, correspond to delta_ilrp_idx_minus1[i][RplsIdx][j]. The ILRP index may, for example, correspond to ilrpIdx. The value of the delta ILRP index information plus 1 may be equal to a delta value between the ILRP index and the standard value.

According to an embodiment, a layer index of an ILRP may be derived based on a layer index of a standard layer, a direct reference layer list, and an ILRP index within the direct reference layer list. The layer index of the ILRP may, for example, correspond to layerIdx. A layer index of a standard layer may, for example, correspond to GeneralLayerIdx[nuh_layer_id]. And, the ILRP index may, for example, correspond to ilrpIdx.

The reference picture list generation (or construction) process according to an embodiment proposed in the present specification may be represented as shown below in Table 10. Details overlapping with Table 6 will be omitted.

TABLE 10

```
The RPL construction process is updated as follows:
The reference picture lists RefPicList[ 0 ] and RefPicList[ 1 ], the reference picture scaling ratios Ref
PicScale[ i ][ j ][ 0 ] and RefPicScale[ i ][ j ][ 1 ], and the reference picture scaled flags RprConstraints
Active[ 0 ][ j ] and RprConstraintsActive[ i ][ j ] are derived as follows:
    for( i = 0; 1 < 2; i++ ) {
        for( j = 0, k = 0, pocBase = PicOrderCntVal; j < num_ref_entries[ i ][ RplsIdx[ i ] ]; j++) {
            if( !inter_layer_ref_pic_flag[ i ][ RplsIdx[ i ] ][ j ] ) {
                ...
            } else {
                ilrpIdx = NumDirectRefLayers[ GeneralLayerIdx[ nuh_layer_id ] ] − ( delta_ilrp_idx
_minus1[ i ][ RplsIdx ][ j ] + 1 )
                layerIdx = DirectRefLayeridx[ GeneralLayerIdx[ nuh layer_id ] ][ ilrpIdx ]
                refPicLayerId = vps_layer_id[ layerIdx ]
                if( there is a reference picture picA in the DPB with nuh_layer_idequal to refPi
cLayerId and
                    the same PicOrderCntVal as the current picture )
                    RefPicList[ i ][ j ] = picA
                else
                    RefPicList[ i ][ j ] = "no reference picture"
            }
            ...
        }
    }
```

According to an embodiment, the delta ILRP index information may be related to a delta value between an ILRP index of the ILRP and a standard value. More specifically, a value of the delta ILRP index information plus 1 (delta ILRP index information+1) may be equal to the delta value between the ILRP index and the standard value. As an example, the standard value may be equal to a number of direct reference layers within the direct reference layer list.

As an index within a direct reference layer list, an ILRP index may be an index for indicating a layer of an ILRP within the direct reference layer list. Herein, the direct reference layer list may be a list including a layer of an ILRP that is directly referred to by a standard slice for performing inter-layer prediction. The standard layer may be a layer including a standard slice. The standard slice may include a current slice.

According to an embodiment, an ILRP index may be derived based on delta ILRP index information and a standard value. The standard value may, for example, correspond to NumDirectRefLayers[GeneralLayerIdx[nuh_layer_id]]. The delta ILRP index information may, for example, correspond to delta_ilrp_idx_minus1[i][RplsIdx][j]. The ILRP index may, for example, correspond to ilrpIdx. The value of the delta ILRP index information plus 1 may be equal to a delta value between the ILRP index and the standard value.

According to an embodiment, a layer index of an ILRP may be derived based on a layer index of a standard layer, a direct reference layer list, and an ILRP index within the direct reference layer list. The layer index of the ILRP may, for example, correspond to layerIdx. The standard value indicating the number of direct reference layers within the direct reference layer list may, for example, correspond to NumDirectRefLayers[GeneralLayerIdx[nuh_layer_id]]. And, the ILRP index may, for example, correspond to ilrpIdx.

According to the embodiment, signaling delta ILRP index information in order to signal a layer index of an ILRP is advantageous in that the number of bits that are needed for signaling information related to inter-layer prediction may be reduced. More specifically, since a layer that is within close range of the layer including a standard slice, e.g., one layer below the layer including a standard slice, is generally used in most cases, the number of bits may be reduced when signaling the delta ILRP index information as compared to when signaling an ILRP index.

Table 11 shown below is an example that is given to facilitate the understanding of a direct reference layer list. Advantages of the embodiment(s) of the present specification will hereinafter be described in detail with reference to the example shown in Table 11.

TABLE 11

| ilrpIdx | direct reference layer (index) |
|---|---|
| 0 | layer 0 |
|  | layer 1 |
| 2 | layer 3 |
| 3 | layer 4 |

For example, a case where a current laver is layer 5 and where layer 4, layer 3, layer 1, layer 0 are referred to by the current layer in order to perform inter-layer prediction may be assumed. In this case, the direct reference layer list may be derived as shown in Table 11. In Table 11, column 1 may indicate ILRP indices, and column 2 may indicate layer indices of the ILRP.

As described above, the value of the delta ILRP index information plus 1 may be equal to a delta value between the ILRP index and the standard value. Herein, the standard value may be equal to a number of direct reference layers within the direct reference layer list, i.e., 4, Therefore, in order to derive a value of delta ILRP index information related to the Table, an ILRP index may be subtracted from the standard value, and 1 may be further subtracted from the subtracted value. That is, when the ILRP index is equal to 3, the delta ILRP index may be derived as 0. When the ILRP index is equal to 2, the delta ILRP index may be derived as 1. When the ILRP index is equal to 1, the delta ILRP index may be derived as 2. And, when the ILRP index is equal to 0, the delta ILRP index may be derived as 3.

As described above, in general cases, since one layer lower than the current layer is referred to in most cases, i.e., since layer to is referred to in most cases, when layer 5 is the current layer, if a value of the delta ILRP index information, i.e., 0, is signaled in order to refer to layer 4, the number of bits may be reduced. And, accordingly, coding efficiency may be increased.

Additionally, according to the embodiment, it is also advantageous in that, by signaling the delta ILRP index information, the SPS of different dependent layers, i.e., layers each having a different layer index, may be shared. Accordingly, the coding efficiency may be increased.

The following drawings are illustrated in order to describe the detailed example(s) of the present specification. The detailed terms of the apparatus (or device) or the detailed terms of the signal(s)/message(s)/field(s) specified in the drawings are merely exemplary. And, therefore, the technical characteristics of the present specification will not be limited only to the detailed terms used in the following drawings.

Figure 7:
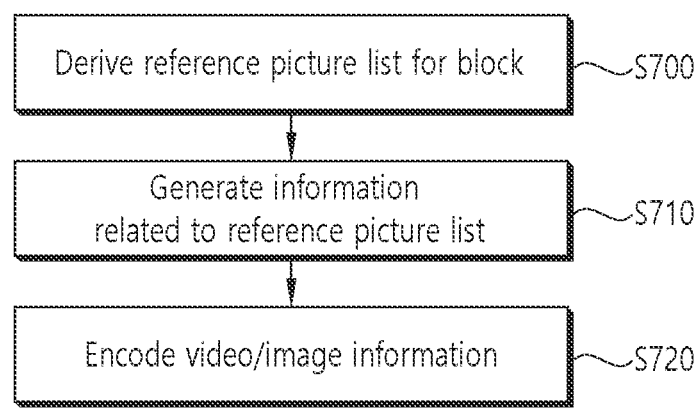
FIG. 7 and FIG. 8 respectively show general examples of a video/image encoding method and a related component according to an embodiment(s) of the present document.
Figure 8:
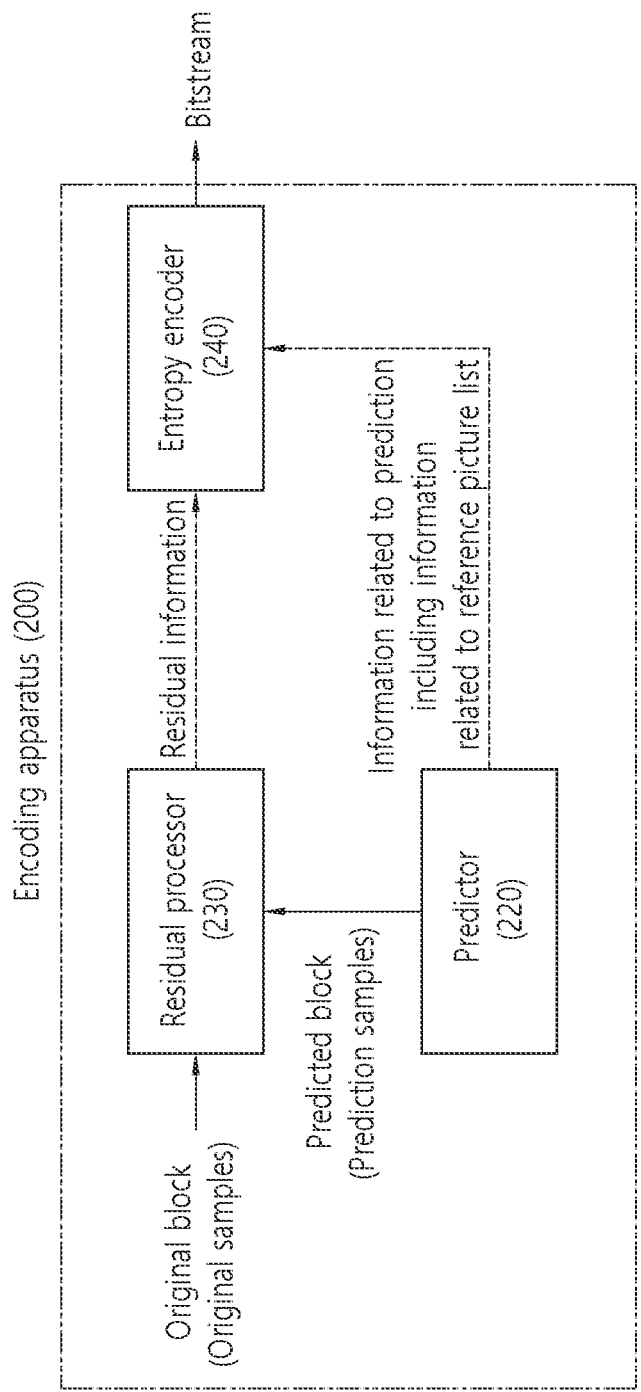

FIG. 7 and FIG. 8 respectively show general examples of a multi-layer based video/image encoding method and a related component according to an embodiment(s) of the present document.

The method disclosed in FIG. 7 may be performed by an encoding apparatus 200 that is disclosed in FIG. 2 and/or FIG. 3. More specifically, S700 and S710 of FIG. 7 may be performed by the predictor of the encoding apparatus 200, and S720 may be performed by the entropy encoder 240 of the encoding apparatus 200. The method disclosed in FIG. 7 may include the embodiments that are described above in the present specification.

Referring to FIG. 7, the encoding apparatus derives a reference picture list for a current block (S700). The encoding apparatus generates information related to the reference picture list (S710). For example, the encoding apparatus may generate information related to the reference picture list based on the reference picture list.

For example, the information related to the reference picture list may include information related to an inter-layer reference picture (ILRP). The information related to ILRP may include delta ILRP index information.

For example, the information related to the reference picture list may include a ref_pic_lists field and a ref_pic_list_struct field. And, the information related to the reference picture list may be delivered (or transferred) by being configured/included in a sequence parameter set, a picture header, and/or a slice header. The information related to the reference picture list may include information that is used for deriving a reference picture list. For example, the information related to the reference picture list may include at least one of information related to a reference picture list index, information related to a long-term reference picture, information related to a short-term reference picture, and/or information related to an inter-layer reference picture. The information related to a long-term reference picture may include information on a Picture Order Count (POC) of the long-term reference picture. The information related to a short-term reference picture may include information on a delta POC of an i-th short-term reference picture, and a delta POC may be derived based on an (i−1)-th POC. The reference picture list may include at least one inter-layer reference picture.

Video/image information may include high level syntax (HLS), and the HLS may include information related to the reference picture list. For example, the HLS may further include information indicating whether the information related to the reference picture list is included in/signaled to the picture header or the slice header. For example, when the information related to the reference picture list is included in/signaled to the picture header, a same reference picture list may be used for performing inter prediction on blocks including different slices within a picture referring to the picture header. As another example, when the information related to the reference picture list is included in/signaled to the slice header, different reference lists may be used for different slices within a same picture. That is, for example, a picture may include a first slice and a second slice, and the information related to a first reference picture list may be included in/signaled to a slice header for the first slice, and the information related to a second reference picture list may be included in/signaled to a slice header for the second slice. At this point, the first reference picture list may be derived for the prediction of a block within the first slice, and the second reference picture list may be derived for the prediction of a block within the second slice. That is, even though the first slice and the second slice exist within the same picture, the first reference picture list and the second reference picture list may be different from one another.

In relation to this, by performing prediction based on the information related to the reference picture list, as described above, the encoding apparatus may derive prediction samples for the current block. Additionally, the encoding apparatus may derive residual samples based on the prediction samples. For example, the encoding apparatus may derive the residual samples through a comparison between original samples of the current block and the prediction samples. Furthermore, the encoding apparatus may generate residual information based on the residual samples, and a sample that has already been reconstructed may additionally generate a residual sample.

The encoding apparatus may include video/image information (S720). For example, the video/image information may include the information related to the reference picture list.

Additionally, the video/image information may include various information according to the embodiment(s) of the present specification. For example, the video/image information may include information disclosed in at least one of Table 1 to Table 10, which are presented above.

Meanwhile, the video/image information may include prediction information and residual information. The prediction information may include prediction mode information (e.g., skip flag, merge flag or mode index, and so on) and motion information. The information related to the motion information may include candidate selection information (e.g., merge index, mvp flag or mvp index), which is information for deriving a motion vector. Additionally, the information related to the motion information may include the above-described information on an MVD and/or reference picture index information. Additionally, the information related to the motion information may include information indicating whether L0 prediction, L1 prediction, or bi-prediction is applied. The residual information is information related to the residual samples, and the residual information may include information related to quantized transform coefficients for the residual samples.

The encoded video/image information may be outputted in the form of a bitstream. The bitstream may be transmitted to a decoding apparatus through a network or a storage medium.

Additionally, as described above, the encoding apparatus may generate a reconstructed picture (including reconstructed samples and a reconstructed block) based on the reference samples and the residual samples. This is to derive the same prediction result in the encoding apparatus as the prediction that is performed in the decoding apparatus. And, this is because, by doing so, the coding efficiency may be increased. Therefore, the encoding apparatus may store the reconstructed picture (reconstructed samples, reconstructed block) in a memory and may use the reconstructed picture as a reference picture for inter prediction. As described above, an in-loop filter procedure, and so on, may be further applied to the reconstructed picture.

More specifically, the information related to the reference picture list may include various information according to the embodiment(s) of the present specification.

According to an embodiment proposed in the present specification, the information related to the reference picture list may include information related to an ILRP. The information related to an ILRP may be information including information related to inter-layer prediction. More specifically, the information related to an ILRP may include delta ILRP index information. The delta ILRP index information may be used for deriving a layer index of an ILRP.

The delta ILRP index information may be related to a delta value between an ILRP index of the ILRP and a standard value. More specifically, a value of the delta ILRP index information plus 1 may be a delta value, i.e., difference value between the ILRP index of the ILRP and the standard value. The ILRP index may be an index indicating a layer of the ILRP within a direct reference layer list of a current layer.

The standard value may, for example, be a layer index of a standard layer. In this case, the standard layer may be the current layer. Alternatively, the standard value may, for example, be equal to a number of direct reference layers within the direct reference layer list. Alternatively, the standard value may, for example, be equal to an ILRP index of a previous ILRP. For example, when the ILRP is ILRP number i within an ILRP list, the previous ILRP may be ILRP number (i−1). That is, the previous ILRP may be an ILRP immediately preceding the ILRP.

An ILRP index may be derived based on signaled delta ILRP index information. More specifically, the ILRP index may be derived by subtracting the value of the delta ILRP index information plus 1 from the standard value. The layer index of the ILRP may be derived based on the derived ILRP index.

The layer index of the ILRP may be derived based on the ILRP index and the direct reference layer list. More specifically, the layer index of the ILRP may be derived based on the ILRP index, the direct reference layer list, and the layer index of the current layer. Prediction samples may be generated based on the derived layer index of the ILRP.

The information related to the reference picture list may include a reference picture list structure field. The reference picture list structure field may include information disclosed in Table 7. For example, the reference picture list structure field may include the delta ILRP index information.

The reference picture list structure field may, for example, be included in a sequence parameter set (SPS). More specifically, the reference picture list structure field may, for example, be included in a sequence parameter set (SPS) and may then be signaled from the encoding apparatus to the decoding apparatus. Herein, the SPS including the reference picture list structure field may be shared by different dependent layers. In other words, the SPS including the reference picture list structure field may be shared by layers each having a different layer index.

Figure 9:
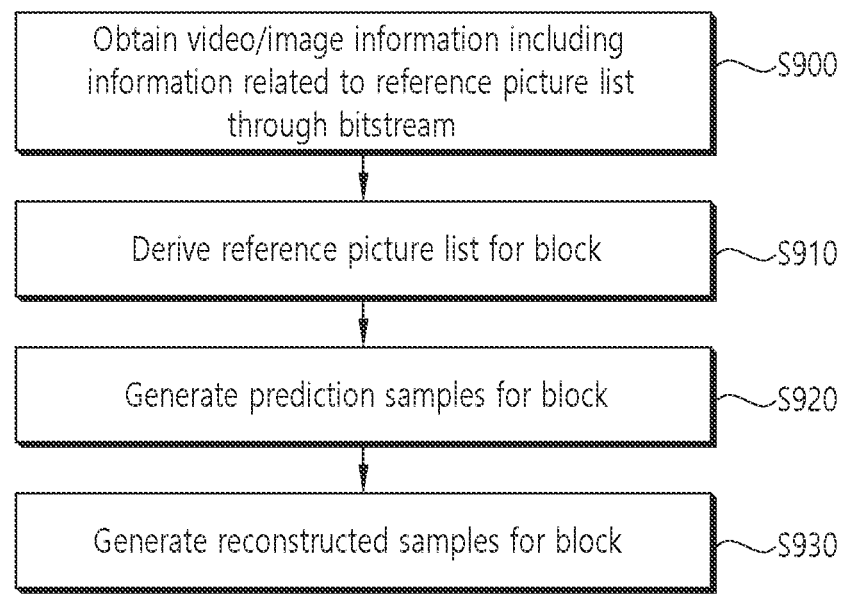
FIG. 9 and FIG. 10 respectively show general examples of a video/image decoding method and a related component according to an embodiment(s) of the present document.
Figure 10:
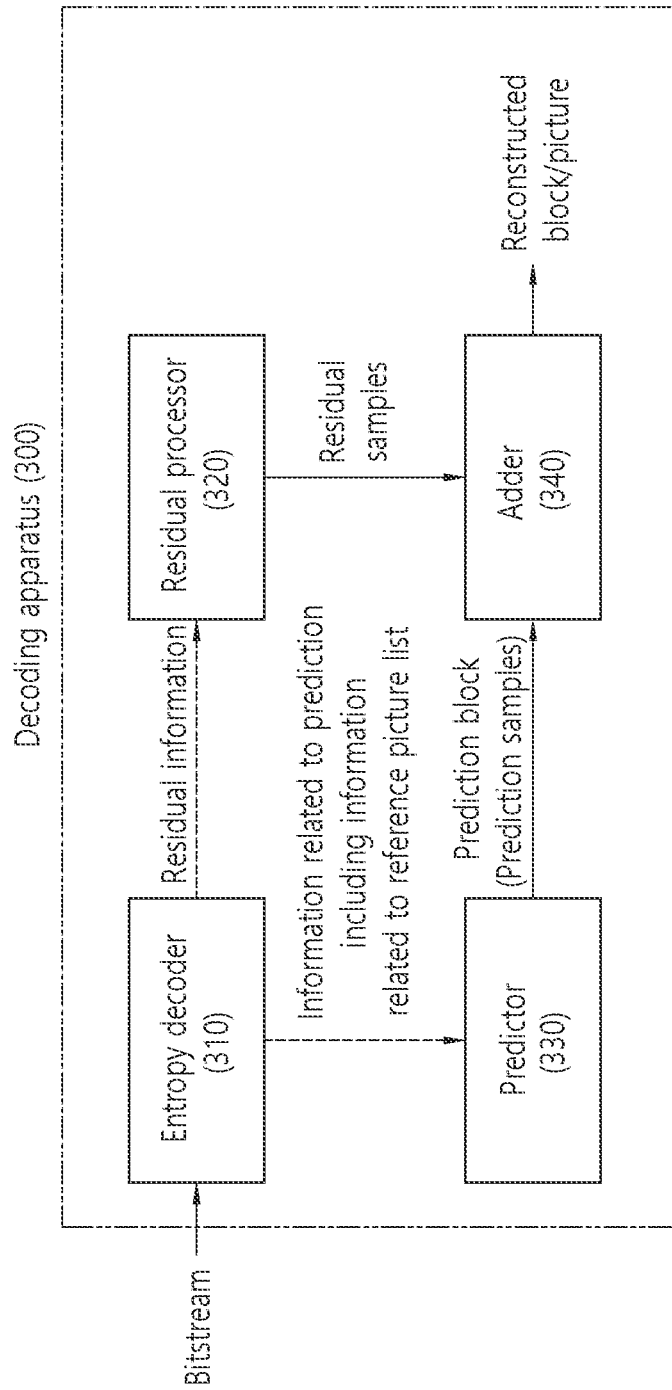

FIG. 9 and FIG. 10 respectively show general examples of a multi-layer based video/image decoding method and a related component according to an embodiment(s) of the present document.

The method disclosed in FIG. 9 may be performed by a decoding apparatus 300 that is disclosed in FIG. 4 and/or FIG. 5. More specifically, for example, S900 of FIG. 9 may be performed by the entropy decoder 310 of the decoding apparatus 300. S910 and S920 may be performed by the predictor 330 of the decoding apparatus 300, and S930 may be performed by the adder 340 of the decoding apparatus 300. The method disclosed in FIG. 9 may include the embodiments that are described above in the present specification.

Referring to FIG. 9, the decoding apparatus receives/obtains video/image information (S900). For example, the decoding apparatus may receive/obtain the video/image information through a bitstream. As an example, the decoding apparatus receives/obtains the video/image information through a bitstream, wherein the video/image information may include the information related to the reference picture list.

For example, the information related to the reference picture list may include information related to an inter-layer reference picture (ILRP). The information related to ILRP may include delta ILRP index information.

Additionally, the video/image information may include various information according to the embodiment(s) of the present specification. For example, the video/image information may include information disclosed in at least one of Table 1 to Table 10, which are presented above.

Meanwhile, for example, the video/image information may include prediction information and residual information. The prediction information may include prediction mode information (e.g., skip flag, merge flag or mode index, and so on) and motion information. The information related to the motion information may include candidate selection information (e.g., merge index, mvp flag or mvp index), which is information for deriving a motion vector. Additionally, the information related to the motion information may include the above-described information on an MVD and/or reference picture index information. Additionally, the information related to the motion information may include information indicating whether L0 prediction. L1 prediction, or bi-prediction is applied. The residual information is information related to the residual samples, and the residual information may include information related to quantized transform coefficients for the residual samples.

The decoding apparatus derives a reference picture list for a current block (S910). For example, the decoding apparatus may derive a reference picture list for a current block based on information related to the reference picture list included in the video/image information.

For example, the information related to the reference picture list may include a ref_pic_lists field and a ref_pic_list_struct field. And, the information related to the reference picture list may be delivered (or transferred) by being configured/included in a sequence parameter set, a picture header, and/or a slice header. The information related to the reference picture list may include information that is used for deriving a reference picture list. For example, the information related to the reference picture list may include at least one of information related to a reference picture list index, information related to a long-term reference picture, information related to a short-term reference picture, and/or information related to an inter-layer reference picture. The information related to a long-term reference picture may include information on a Picture Order Count (POC) of the long-term reference picture. The information related to a short-term reference picture may include information on a delta POC of an i-th short-term reference picture, and a delta POC may be derived based on an (i−1)-th POC. The reference picture list may include at least one inter-layer reference picture.

Video/image information may include high level syntax (HLS), and the HLS may include information related to the reference picture list. For example, the HLS may further include information indicating whether the information related to the reference picture list is included in/signaled to the picture header or the slice header. For example, when the information related to the reference picture list is included in/signaled to the picture header, a same reference picture list may be used for performing inter prediction on blocks including different slices within a picture referring to the picture header. As another example, when the information related to the reference picture list is included in/signaled to the slice header, different reference lists may be used for different slices within a same picture. That is, for example, a picture may include a first slice and a second slice, and the information related to a first reference picture list may be included in/signaled to a slice header for the first slice, and the information related to a second reference picture list may be included in/signaled to a slice header for the second slice. At this point, the first reference picture list may be derived for the prediction of a block within the first slice, and the second reference picture list may be derived for the prediction of a block within the second slice. That is, even though the first slice and the second slice exist within the same picture, the first reference picture list and the second reference picture list may be different from one another.

The decoding apparatus generates prediction samples for a current block (S920). For example, the decoding apparatus may generate the prediction samples for the current block based on the reference picture list. As an example, the decoding apparatus may generate the prediction samples for the current block based on a reference picture within the reference picture list. For example, the information related to the reference picture list may include reference picture index information. The decoding apparatus may derive a reference picture index of the current block based on the reference picture index information. For example, a picture that is indicated by the reference picture index within the reference picture list for the current block may be derived as a reference picture, which is referred to for performing inter prediction of the current block. When inter-layer prediction is performed, information related to the reference picture list may include information related to an ILRP. The decoding apparatus may derive a layer index of an inter-layer reference picture that is referred to by the current block based on the information related to the ILRP. A layer that is referred to by a current layer and the reference picture that is referred to by the current block are derived, based on a layer index of the inter-layer reference picture and the reference picture index, and prediction samples of the current block may be derived by using samples of a reference block, which is indicated within the reference picture by a motion vector of the current block. In this case, as described above, in some cases, a prediction sample filtering procedure may be further performed on all or part of the prediction samples of the current block.

The decoding apparatus generates reconstructed samples for the current block (S930). For example, the decoding apparatus may generate the reconstructed samples for the current block based on the prediction samples. Additionally, for example, the decoding apparatus may generate the reconstructed samples for the current block based on residual samples for the current block and the prediction samples. The residual samples for the current block may be generated based on received residual information. Additionally, as an example, the decoding apparatus may generate a reconstructed picture including the reconstructed samples. Thereafter, as described above, an in-loop filter procedure, and so on, may be further applied to the reconstructed picture.

Herein, the information related to the reference picture list may include various information according to the embodiment(s) of the present specification.

According to an embodiment proposed in the present specification, the information related to the reference picture list may include information related to an ILRP. The information related to an ILRP may be information including information related to inter-layer prediction. More specifically, the information related to an ILRP may include delta ILRP index information. The delta ILRP index information may be used for deriving a layer index of an ILRP.

The delta ILRP index information may be related to a delta value between an ILRP index of the ILRP and a standard value. More specifically, a value of the delta ILRP index information plus 1 may be a delta value, i.e., difference value between the ILRP index of the ILRP and the standard value. The ILRP index may be an index indicating a layer of the ILRP within a direct reference layer list of a current layer.

The standard value may, for example, be a layer index of a standard layer. In this case, the standard layer may be the current layer. Alternatively, the standard value may, for example, be equal to a number of direct reference layers within the direct reference layer list. Alternatively, the standard value may, for example, be equal to an ILRP index of a previous ILRP. For example, when the ILRP is ILRP number i within an ILRP list, the previous ILRP may be ILRP number (i−1). That is, the previous ILRP may be an ILRP immediately preceding the ILRP.

An ILRP index may be derived based on signaled delta ILRP index information. More specifically, the ILRP index may be derived by subtracting the value of the delta ILRP index information plus 1 from the standard value. The layer index of the ILRP may be derived based on the derived ILRP index.

The layer index of the ILRP may be derived based on the ILRP index and the direct reference layer list. More specifically, the layer index of the ILRP may be derived based on the ILRP index, the direct reference layer list, and the layer index of the current layer. Prediction samples may be generated based on the derived layer index of the ILRP.

The information related to the reference picture list may include a reference picture list structure field. The reference picture list structure field may include information disclosed in Table 7. For example, the reference picture list structure field may include the delta ILRP index information.

The reference picture list structure field may, for example, be included in a sequence parameter set (SPS). More specifically, the reference picture list structure field may, for example, be included in a sequence parameter set (SPS) and may then be signaled from the encoding apparatus to the decoding apparatus. Herein, the SPS including the reference picture list structure field may be shared by different dependent layers. In other words, the SPS including the reference picture list structure field may be shared by layers each having a different layer index.

In the above-described embodiments, the methods are explained based on flowcharts by means of a series of steps or blocks, but the present disclosure is not limited to the order of steps, and a certain step may be performed in order or step different from that described above, or concurrently with another step. Further, it may be understood by a person having ordinary skill in the art that the steps shown in a flowchart are not exclusive, and that another step may be incorporated or one or more steps of the flowchart may be removed without affecting the scope of the present disclosure.

The above-described methods according to the present disclosure may be implemented as a software form, and an encoding apparatus and/or decoding apparatus according to the disclosure may be included in a device for image processing, such as, a TV, a computer, a smartphone, a set-top box, a display device or the like.

When embodiments in the present disclosure are embodied by software, the above-described methods may be embodied as modules (processes, functions or the like) to perform the above-described functions. The modules may be stored in a memory and may be executed by a processor. The memory may be inside or outside the processor and may be connected to the processor in various well-known manners. The processor may include an application-specific integrated circuit (ASIC), other chipset, logic circuit, and/or a data processing device. The memory may include a read-only memory (ROM), a random access memory (RAM), a flash memory, a memory card, a storage medium, and/or other storage device. That is, embodiments described in the present disclosure may be embodied and performed on a processor, a microprocessor, a controller or a chip. For example, function parts shown in each drawing may be embodied and performed on a computer, a processor, a microprocessor, a controller or a chip. In this case, information for implementation (e.g., information on instructions) or an algorithm may be stored in a digital storage medium.

Furthermore, the decoding apparatus and the encoding apparatus to which this document is applied may be included in a multimedia broadcasting transmission and reception device, a mobile communication terminal, a home cinema video device, a digital cinema video device, a camera for monitoring, a video dialogue device, a real-time communication device such as video communication, a mobile streaming device, a storage medium, a camcorder, a video on-demand (VoD) service provision device, an over the top (OTT) video device, an Internet streaming service provision device, a three-dimensional (3D) video device, a virtual reality (VR) device, an augmented reality (AR) device, a video telephony device, transportation means terminal (e.g., a vehicle (including autonomous vehicle) terminal, an aircraft terminal, and a vessel terminal), and a medical video device, and may be used to process a video signal or a data signal. For example, the over the top (OTT) video device may include a game console, a Blueray player, Internet access TV, a home theater system, a smartphone, a tablet PC, and a digital video recorder (DVR).

Furthermore, the processing method to which this document is applied may be produced in the form of a program executed by a computer, and may be stored in a computer-readable recording medium. Multimedia data having a data structure according to this document may also be stored in a computer-readable recording medium. The computer-readable recording medium includes all types of storage devices in which computer-readable data is stored. The computer-readable recording medium may include Blueray disk (BD), a universal serial bus (USB), a ROM, a PROM, an EPROM, an EEPROM, a RAM, a CD-ROM, a magnetic tape, a floppy disk, and an optical data storage device, for example. Furthermore, the computer-readable recording medium includes media implemented in the form of carriers (e.g., transmission through the Internet). Furthermore, a bit stream generated using an encoding method may be stored in a computer-readable recording medium or may be transmitted over wired and wireless communication networks.

Furthermore, an embodiment of this document may be implemented as a computer program product using program code. The program code may be performed by a computer according to an embodiment of this document. The program code may be stored on a carrier readable by a computer.

Figure 11:
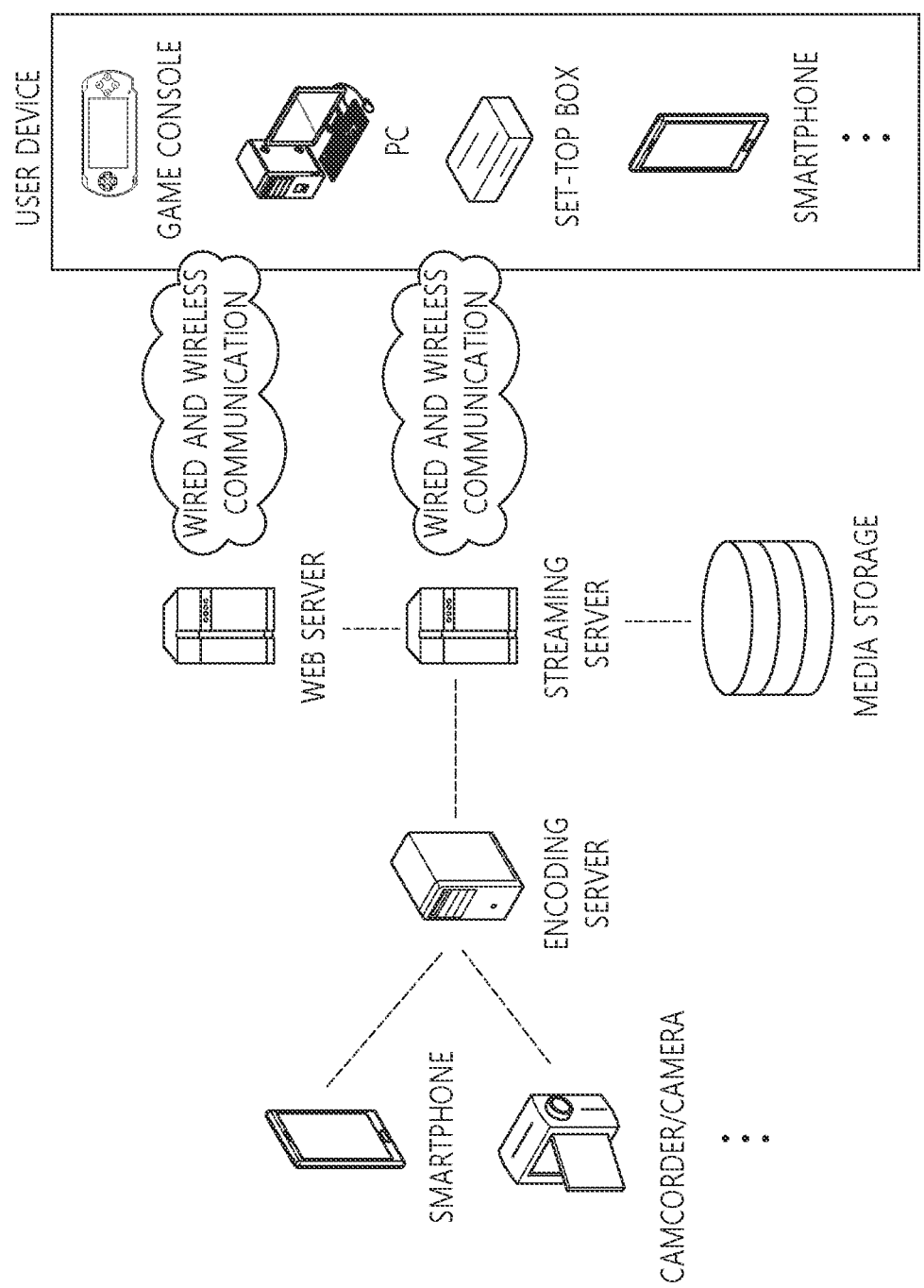
FIG. 11 illustrates an example of a content streaming system to which embodiments disclosed in the present document may be applied.

FIG. 11 illustrates an example of a content streaming system to which embodiments disclosed in this document may be applied.

Referring to FIG. 11, the content streaming system to which the embodiments of the present document are applied may basically include an encoding server, a streaming server, a web server, a media storage, a user device, and a multimedia input device.

The encoding server compresses content input from multimedia input devices such as a smartphone, a camera, a camcorder, etc. into digital data to generate a bitstream and transmit the bitstream to the streaming server. As another example, when the multimedia input devices such as smartphones, cameras, camcorders, etc. directly generate a bitstream, the encoding server may be omitted.

The bitstream may be generated by an encoding method or a bitstream generating method to which the embodiment(s) of the present document is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server delivers it to a streaming server, and the streaming server transmits multimedia data to the user. In this case, the content streaming system may include a separate control server. In this case, the control server serves to control a command/response between devices in the content streaming system.

The streaming server may receive content from a media storage and/or an encoding server. For example, when the content is received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (e.g., smartwatches, smart glasses, head mounted displays), digital TVs, desktops computer, digital signage, and the like.

Each server in the content streaming system may be operated as a distributed server, in which case data received from each server may be distributed.

The appended claims of the present disclosure may be combined in various ways. For example, technical features of method claims of the present disclosure may be combined to be implemented as an apparatus, and technical features of apparatus claims of the present disclosure may be combined to be implemented as a method. Also, technical features of method claims and technical features of apparatus claims of the present disclosure may be combined to be implemented as an apparatus, and technical features of method claims and technical features of apparatus claims of the present disclosure may be combined to be implemented as a method.

What is claimed is:

1. A multi-layer based image decoding method performed by a decoding apparatus, the method comprising:
obtaining image information comprising information related to a reference picture list through a bitstream;
deriving the reference picture list based on the information related to the reference picture list;
generating prediction samples of a current block by performing prediction on the current block based on a reference picture comprised in the reference picture list; and
generating a reconstructed picture comprising reconstructed samples based on the prediction samples,
wherein the information related to the reference picture list comprises information related to an inter-layer reference picture (ILRP),
wherein the information related to the ILRP comprises a delta ILRP index information used to represent a layer index of the ILRP,
wherein the image information comprises a reference picture list structure field,
wherein the reference picture list structure field comprises flag information related to whether an ILRP is used,
wherein the delta ILRP index information is comprised in the reference picture list structure field based on a value of the flag information related to whether an ILRP is used being equal to 1,
wherein the reference picture list structure field is comprised in a Sequence Parameter Set (SPS),
wherein a value of the delta ILRP index information is included in a range of 0 to a value of a syntax element vps_max_layers_minus1, and
wherein the syntax element vps_max_layers_minus1 represents a maximum allowed number of layers in each CVS referring to a Video Parameter Set (VPS).

2. The method of claim 1, wherein the delta ILRP index information is related to a delta value between an ILRP index of the ILRP and a layer index of a standard layer, and
wherein the ILRP index indicates a layer of the ILRP in a direct reference layer list of a current layer.

3. The method of claim 2, wherein the standard layer is the current layer comprising a current slice,
wherein the ILRP index is derived based on the current layer and the delta ILRP index information,
wherein the layer index of the ILRP is derived based on the ILRP index and the direct reference layer list, and
wherein the prediction samples are generated based on the layer index of the ILRP.

4. The method of claim 3, wherein a value of the delta ILRP index information plus 1 is equal to a delta value between the ILRP index and a layer index of the current layer.

5. The method of claim 1, wherein the delta ILRP index information is related to a delta value between an ILRP index of the ILRP and a standard value,
wherein the ILRP index indicates a layer of the ILRP in a direct reference layer list of a current layer, and
wherein the layer index of the ILRP is derived based on the ILRP index and the direct reference layer list.

6. The method of claim 5, wherein the standard value is equal to a layer index of the current layer or equal to a number of direct reference layers in the direct reference layer list.

7. The method of claim 6, wherein a value of the delta ILRP index information plus 1 is equal to a delta value between the ILRP index and the number of the direct reference layers in the direct reference layer list, and
wherein the ILRP index is derived by subtracting the value of the delta ILRP index information plus 1 from the number of the direct reference layers in the direct reference layer list.

8. The method of claim 7, wherein the layer index of the ILRP is derived based on the ILRP index, the direct reference layer list and the layer index of the current layer, and
wherein the prediction samples are generated based on the layer index of the ILRP.

9. The method of claim 1, wherein the SPS comprising the reference picture list structure field is shared by layers having different layer indices.

10. A multi-layer based image encoding method performed by an encoding apparatus, the method comprising:
deriving a reference picture list comprising an inter-layer reference picture (ILRP);
generating information related to the reference picture list; and
encoding image information comprising the information related to the reference picture list,
wherein the information related to the reference picture list comprises information related to the ILRP,
wherein the information related to the ILRP comprises a delta ILRP index information used to represent a layer index of the ILRP,
wherein the image information comprises a reference picture list structure field,
wherein the reference picture list structure field comprises flag information related to whether an ILRP is used,
wherein the delta ILRP index information is comprised in the reference picture list structure field based on a value of the flag information related to whether an ILRP is used being equal to 1,
wherein the reference picture list structure field is comprised in a Sequence Parameter Set (SPS),
wherein a value of the delta ILRP index information is included in a range of 0 to a value of a syntax element vps_max_layers_minus1, and
wherein the syntax element vps_max_layers_minus1 represents a maximum allowed number of layers in each CVS referring to a Video Parameter Set (VPS).

11. The method of claim 10, wherein the delta ILRP index information is related to a delta value between an ILRP index of the ILRP and a layer index of a standard layer, and
wherein the ILRP index indicates a layer of the ILRP in a direct reference layer list of a current layer.

12. The method of claim 10, wherein the delta ILRP index information is related to a delta value between an ILRP index of the ILRP and a standard value,
wherein the ILRP index indicates a layer of the ILRP in a direct reference layer list of a current layer,
wherein the layer index of the ILRP is derived based on the ILRP index and the direct reference layer list, and
wherein the standard value is equal to a layer index of the current layer or equal to a number of direct reference layers in the direct reference layer list.

13. The method of claim 12, wherein a value of the delta ILRP index information plus 1 is equal to a delta value between the ILRP index and the number of the direct reference layers in the direct reference layer list,
wherein the ILRP index is derived by subtracting the value of the delta ILRP index information plus 1 from the number of the direct reference layers in the direct reference layer list, and
wherein the layer index of the ILRP is derived based on the ILRP index, the direct reference layer list and the layer index of the current layer.

14. A transmission method of data for an image, the transmission method comprising:
obtaining a bitstream generated by based on deriving a reference picture list comprising an inter-layer reference picture (ILRP), generating information related to the reference picture list, and generating the bitstream by encoding image information comprising the information related to the reference picture list; and
transmitting the data comprising the bitstream,
wherein the information related to the reference picture list comprises information related to the ILRP,
wherein the information related to the ILRP comprises a delta ILRP index information used to represent a layer index of the ILRP,
wherein the image information comprises a reference picture list structure field,
wherein the reference picture list structure field comprises flag information related to whether an ILRP is used,
wherein the delta ILRP index information is comprised in the reference picture list structure field based on a value of the flag information related to whether an ILRP is used being equal to 1,
wherein the reference picture list structure field is comprised in a Sequence Parameter Set (SPS),
wherein a value of the delta ILRP index information is included in a range of 0 to a value of a syntax element vps_max_layers_minus1, and
wherein the syntax element vps_max_layers_minus1 represents a maximum allowed number of layers in each CVS referring to a Video Parameter Set (VPS).

* * * * *